United States Patent
Hiasa et al.

(10) Patent No.: US 9,451,147 B2
(45) Date of Patent: Sep. 20, 2016

(54) IMAGE PROCESSING APPARATUS, IMAGE PROCESSING METHOD, IMAGE PICKUP APPARATUS, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Norihito Hiasa, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 13/912,455

(22) Filed: Jun. 7, 2013

(65) Prior Publication Data

US 2013/0329120 A1 Dec. 12, 2013

(30) Foreign Application Priority Data

Jun. 11, 2012 (JP) .................................. 2012-131598
Jun. 11, 2012 (JP) .................................. 2012-131641

(51) Int. Cl.
  *H04N 5/232* (2006.01)
  *G03B 13/00* (2006.01)
  *H04N 5/225* (2006.01)
  *G06T 5/50* (2006.01)

(52) U.S. Cl.
  CPC ............. *H04N 5/23212* (2013.01); *G06T 5/50* (2013.01); *H04N 5/2254* (2013.01); *H04N 5/23229* (2013.01); *G06T 2200/21* (2013.01); *G06T 2207/10052* (2013.01); *G06T 2207/20208* (2013.01)

(58) Field of Classification Search
  CPC ..................... H04N 5/23212; H04N 5/23229; H04N 5/2254
  USPC ............................... 348/345, 222.1, 340, 349
  See application file for complete search history.

(56) References Cited

U.S. PATENT DOCUMENTS

2007/0252074 A1* 11/2007 Ng et al. ..................... 250/208.1
2009/0128669 A1* 5/2009 Ng et al. ....................... 348/241
2009/0185801 A1* 7/2009 Georgiev et al. ............. 396/332

(Continued)

OTHER PUBLICATIONS

Ren Ng, et al., "Light Field Photography with a Hand-held Plenoptic Camera", 2005 Computer Science Technical Report CTSR, pp. 1-11.

(Continued)

*Primary Examiner* — Sinh Tran
*Assistant Examiner* — Zhenzhen Wu
(74) *Attorney, Agent, or Firm* — Rossi, Kimms & McDowell LLP

(57) ABSTRACT

An image processing method is capable of performing a reconstruction for an input image so as to generate a plurality of output images having a plurality of focus positions different from each other, and the image processing method includes the steps of obtaining the input image that is an image containing information of an object space obtained from a plurality of points of view using an image pickup apparatus having an imaging optical system and an image pickup element including a plurality of pixels, and calculating a pixel shift amount of pixels that are to be combined by the reconstruction for a plurality of virtual imaging planes corresponding to the plurality of focus positions.

21 Claims, 14 Drawing Sheets

(56) References Cited

U.S. PATENT DOCUMENTS

| | | | |
|---|---|---|---|
| 2009/0190024 A1* | 7/2009 | Hayasaka | H01L 27/14627 348/360 |
| 2010/0141802 A1* | 6/2010 | Knight et al. | 348/240.3 |
| 2010/0194921 A1* | 8/2010 | Yoshioka | H04N 5/2254 348/231.99 |
| 2010/0265385 A1* | 10/2010 | Knight | H04N 5/232 348/340 |
| 2011/0129165 A1* | 6/2011 | Lim et al. | 382/255 |
| 2013/0128087 A1* | 5/2013 | Georgiev | H04N 5/2254 348/307 |

OTHER PUBLICATIONS

Todor Georgiev, et al., "Superresolution with Plenoptic 2.0 Cameras", 2009 Optical Society of America, pp. 1-3.

Ren Ng "Fourier Slice Photography", 2005, ACM Trans. Graph. 24, 735-744.

\* cited by examiner

IMAGE PROCESSING APPARATUS, IMAGE PROCESSING METHOD, IMAGE PICKUP APPARATUS, METHOD OF CONTROLLING IMAGE PICKUP APPARATUS, AND NON-TRANSITORY COMPUTER-READABLE STORAGE MEDIUM

BACKGROUND OF THE INVENTION

1. Field of the Invention

The present invention relates to an image processing method that is capable of performing a reconstruction for an input image so as to generate a plurality of output images that have focus positions different from each other.

2. Description of the Related Art

Recently, an image pickup apparatus that performs a calculation using data obtained by an image pickup element and performs a corresponding digital image processing so as to output various images is proposed. Ren Ng, et al., "Light Field Photography with a Hand-held Plenoptic Camera", 2005 Computer Science Technical Report CTSR, and Todor Georgiev, et al., "Superresolution with Plenoptic 2.0 Camera", 2009 Optical Society of America, disclose an image pickup apparatus that simultaneously obtains the two-dimensional light intensity distribution and parallax information (collectively, referred to as a "light field") on an object plane. According to this image pickup apparatus, obtaining the light field, a focus position of an image can be changed by an image processing after taking an image, which is called a refocus, and a depth of field can be adjusted. However, in this image pickup apparatus, pixels of the image pickup element need to be allocated to store the parallax information, as well as the two-dimensional light intensity distribution of the light. Therefore, a spatial resolution is deteriorated compared to an image pickup apparatus which stores only the two-dimensional light intensity distribution of the light.

Todor Georgiev, et al., "Superresolution with Plenoptic 2.0 Camera", 2009 Optical Society of America, discloses a configuration in which a certain point on an image plane that is formed by an imaging optical system is taken by a plurality of small lenses constituting a lens array. A plurality of small images obtained like this are reconstructed so that the resolution of the reconstructed image can be improved. Such a method of improving the resolution is referred to as a "super-resolution from subpixel shift". Todor Georgiev, et al., "Superresolution with Plenoptic 2.0 Camera", 2009 Optical Society of America, discloses a method of obtaining an effect of the super-resolution from subpixel shift at a specific focus position. However, it does not consider how to change the effect of the super-resolution from subpixel shift when an image is generated at a plurality of focus position different from each other. Therefore, a focus position at which a refocus image has a high resolution cannot be specified. If the effect of the super-resolution from subpixel shift at the plurality of focus positions is calculated, a high-resolution refocus image can be automatically generated by using its result, or a user can be informed of a focus position at which the great effect of the super-resolution from subpixel shift is obtained.

Furthermore, Todor Georgiev, et al., "Superresolution with Plenoptic 2.0 Camera", 2009 Optical Society of America, discloses a method of obtaining the effect of the super-resolution from subpixel shift at a specific focus position. However, an effect of the super-resolution from subpixel shift when generating a refocus image at an arbitrary focus position is not disclosed. Since the effect of the super-resolution from subpixel shift changes in accordance with the focus position, there is a case where a focus position with high resolution may exist within a range capable of refocusing compared to a specific focus position. Thus, an object designated by a user at the time of taking an image (a main object) does not necessarily exist on a focus position with high resolution.

BRIEF SUMMARY OF THE INVENTION

The present invention provides an image processing method, an image pickup apparatus, an image processing apparatus, and a non-transitory computer-readable storage medium that are capable of calculating a focus position at which a high-resolution refocus image is obtained. In addition, the present invention provides an image pickup apparatus and a method of controlling the image pickup apparatus that are capable of obtaining a main object with high resolution.

An image processing method as one aspect of the present invention is capable of performing a reconstruction for an input image so as to generate a plurality of output images having a plurality of focus positions different from each other, and the image processing method includes the steps of obtaining the input image that is an image containing information of an object space obtained from a plurality of points of view using an image pickup apparatus having an imaging optical system and an image pickup element including a plurality of pixels, and calculating a pixel shift amount of pixels that are to be combined by the reconstruction for a plurality of virtual imaging planes corresponding to the plurality of focus positions.

An image pickup apparatus as another aspect of the present invention is capable of performing a reconstruction for an input image so as to generate a plurality output images having a plurality of focus positions different from each other, and the image pickup apparatus includes an imaging optical system, an image pickup element including a plurality of pixels, a pupil dividing portion configured so that a ray from the same position of an object plane enters pixels of the image pickup element different from each other in accordance with a pupil region of the imaging optical system through which the ray passes, and an image processing portion configured to perform the reconstruction using image pickup condition information of the input image for the input image obtained by the image pickup element so as to generate the output image, and the image processing portion calculates a pixel shift amount of pixels that are to be combined by the reconstruction for a plurality of virtual imaging planes corresponding to the plurality of focus positions.

An image processing apparatus as another aspect of the present invention is capable of performing a reconstruction for an input image so as to generate a plurality output images having a plurality of focus positions different from each other, and the image processing apparatus includes a storage portion configured to store image pickup condition information of the input image, and an image processing portion configured to perform the reconstruction using the image pickup condition information for the input image so as to generate the output image, and the image processing portion calculates a pixel shift amount of pixels that are to be combined by the reconstruction for a plurality of virtual imaging planes corresponding to a plurality of focus positions.

A non-transitory computer-readable storage medium as another aspect of the present invention stores a program capable of performing a reconstruction for an input image so as to generate a plurality output images having a plurality of focus positions different from each other, the program is executable by an information processing apparatus, and the program includes the steps of obtaining the input image that is an image containing information of an object space obtained from a plurality of points of view using an image pickup apparatus having an imaging optical system and an image pickup element including a plurality of pixels, and calculating a pixel shift amount of pixels that are to be combined by the reconstruction for a plurality of virtual imaging planes corresponding to the plurality of focus positions.

An image pickup apparatus as another aspect of the present invention is capable of performing a reconstruction for a first image so as to generate a plurality of second images having a plurality of focus positions different from each other, and the image pickup apparatus includes an imaging optical system, an image pickup element including a plurality of pixels configured to obtain the first image, a pupil dividing portion configured so that a ray from the same position of an object plane enters pixels of the image pickup element different from each other in accordance with a pupil region of the imaging optical system through which the ray passes, a focus adjusting portion configured to adjust an imaging position of the imaging optical system, and an image processing portion configured to perform the reconstruction using image pickup condition information of the first image for the first image obtained by the image pickup element so as to generate the second image, and the focus adjusting portion is configured to perform a first focus adjustment that adjusts an imaging position of the imaging optical system for a reference object, and a second focus adjustment that moves the imaging position of the imaging optical system for a main object so as to improve a resolution of the main object in accordance with a shift amount of pixels that are to be combined by the reconstruction.

A method of controlling the image pickup apparatus as another aspect of the present invention is capable of performing a reconstruction for a first image so as to generate a plurality of second images having a plurality of focus positions different from each other, and the method includes the steps of performing a first focus adjustment that adjusts an imaging position for a reference object of an imaging optical system included in the image pickup apparatus, performing a second focus adjustment that moves the imaging position of the imaging optical system for a main object so as to improve a resolution of the main object in accordance with a shift amount of pixels that are to be combined by the reconstruction, and obtaining the first image by taking an image using the image pickup apparatus.

A non-transitory computer-readable storage medium as another aspect of the present invention stores a program capable of performing a reconstruction for a first image so as to generate a plurality of second images having a plurality of focus positions different from each other, the program is executable by an information processing apparatus, and the program includes the steps of performing a first focus adjustment that adjusts an imaging position for a reference object of an imaging optical system included in the image pickup apparatus, performing a second focus adjustment that moves the imaging position of the imaging optical system for a main object so as to improve a resolution of the main object in accordance with a shift amount of pixels that are to be combined by the reconstruction, and obtaining the first image by taking an image using the image pickup apparatus.

Further features and aspects of the present invention will become apparent from the following description of exemplary embodiments with reference to the attached drawings.

DETAILED DESCRIPTION OF THE PREFERRED EMBODIMENTS

Figure 1:
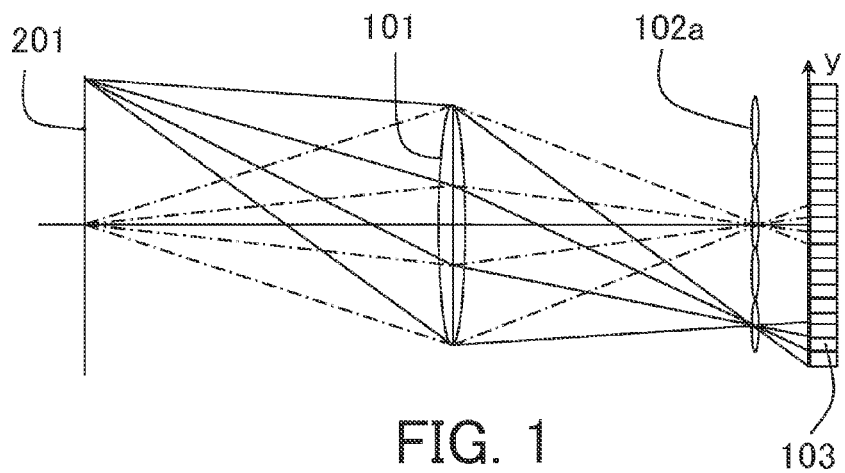
FIG. 1 is a schematic configuration diagram of an image pickup optical system in Embodiment 1 or 4.

Exemplary embodiments of the present invention will be described below with reference to the accompanied drawings. In the drawings, the same elements will be denoted by the same reference numerals and the descriptions thereof will be omitted.

An image processing method, an image pickup apparatus, a method of controlling the image pickup apparatus, an image processing apparatus, and an image processing program stored in a non-transitory computer-readable storage medium of the present embodiment can reconstruct an input image (a first image) so as to generate a plurality of output images (second images) that have focus positions different from each other. The image pickup apparatus of the present embodiment includes a plurality of optical systems having a positive refractive power are arrayed or includes a lens array that is disposed at an image side of an imaging optical system so that a light field can be obtained. The input image (the first image) is an image that is obtained by the image pickup apparatus (an image pickup element). When the output image (the second image) is generated, an image that is obtained by performing a demosaicing processing or the like for the input image may also be used.

Figure 2:
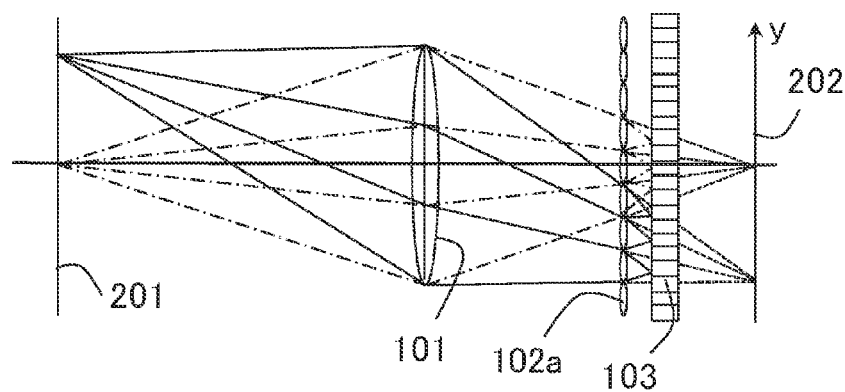
FIG. 2 is a schematic configuration diagram of an image pickup optical system in Embodiment 2 or 5.
Figure 3:
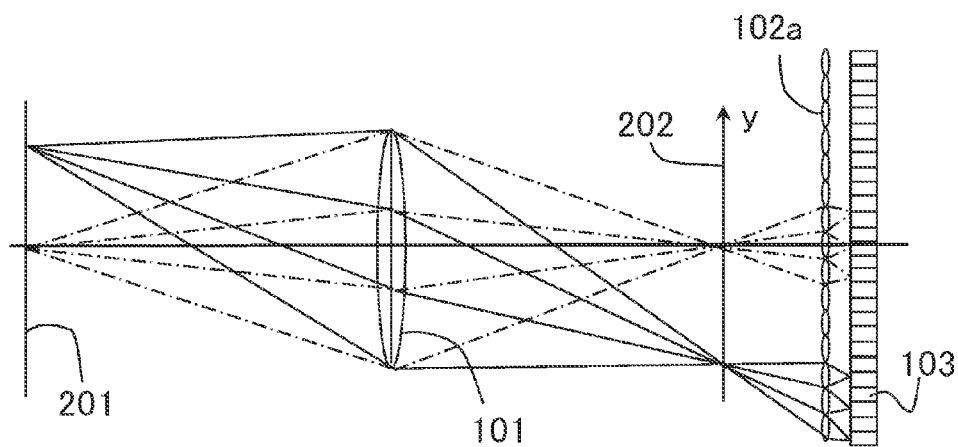
FIG. 3 is a schematic configuration diagram of an image pickup optical system in Embodiment 3 or 6.

FIGS. 1 to 3 are examples of an image pickup optical system that constitutes the image pickup apparatus in the present embodiment. The image pickup optical system is configured by including the imaging optical system and the image pickup element, which is configured by including a lens array if the lens array is provided. A human or an object does not need to exist on an object plane 201 illustrated in FIGS. 1 to 3. This is because focusing can be performed for the human or the object that exists behind or in front of the object plane 201 by performing a reconstruction processing after taking an image. Descriptions in each of the following embodiments will use a one-dimensional system for easy understanding, but the same is true for a two-dimensional system.

Embodiment 1

Figure 4:
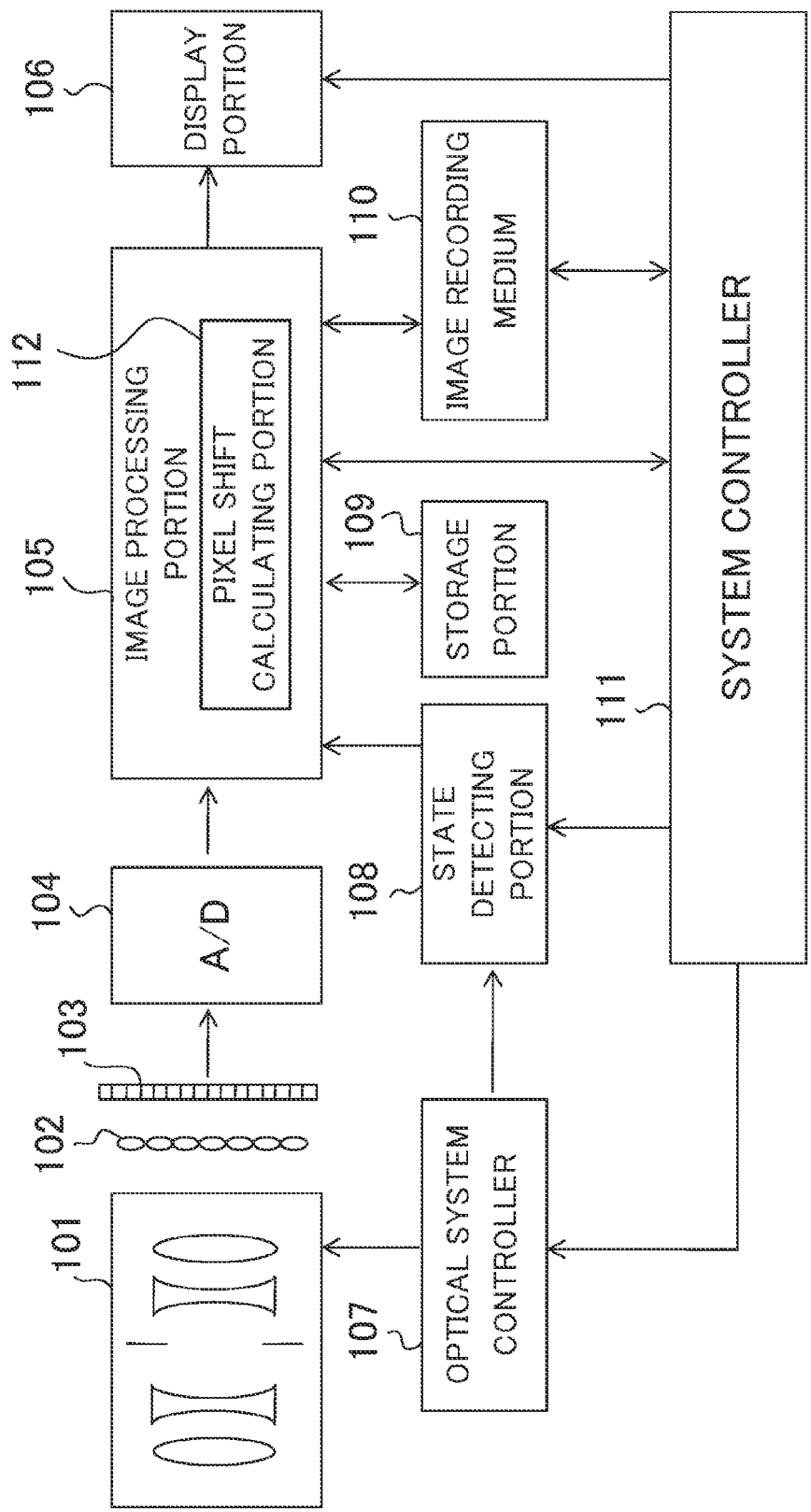
FIG. 4 is a block diagram of an image pickup apparatus in Embodiment 1 or 2.

First of all, referring to FIG. 4, a configuration of an image pickup apparatus in Embodiment 1 of the present invention will be described. FIG. 4 is a block diagram of the image pickup apparatus in the present embodiment. An image processing method of the present embodiment is performed by an image processing portion (image processor) 105 of the image pickup apparatus.

A pupil dividing portion (pupil divider) 102 enables a ray from the same position on an object plane to enter pixels of an image pickup element 103 which are different from each other in accordance with a pupil region of an imaging optical system 101 where the ray passes. The image pickup element 103 is a two-dimensional image pickup element such as a CCD (Charge Coupled Device) or a CMOS (Complementary Metal-Oxide Semiconductor), which includes a plurality of pixels. An energy of the ray that enters the image pickup element 103 via the imaging optical system 101 (a main lens unit) and the pupil dividing portion 102 is converted to an electric signal (an analog signal), and the analog signal is converted to a digital signal by an A/D converter 104. A predetermined processing is performed for this digital signal by an image processing portion 105, and then it is stored in a predetermined format in an image recording medium 110 such as a semiconductor memory. In this case, image pickup condition information of the image pickup apparatus that is obtained from a state detecting portion 108 is also stored at the same time. The image pickup condition information means an object distance, an aperture stop, a focal length of a zoom lens, or the like. The state detecting portion 108 may directly obtain the image pickup condition information from a system controller 111, and with respect to information related to the image pickup optical system, the state detecting portion 108 can also obtain the information from an optical system controller 107.

When the image stored in the image recording medium 110 is displayed on a display portion 106, a reconstruction processing is performed by the image processing portion 105 based on the image pickup condition information. As a result, an image reconstructed so as to be desired point of view, focus position, or a depth of field is displayed on the display portion 106. In order to perform a high speed operation, a desired image setting (the point of view, focusing (the focus position), the depth of field, or the like) may also be previously stored in a storage portion (non-transitory computer-readable storage medium) 109 so that a reconstructed image is directly displayed on the display portion 106 without involving the image recording medium 110. Furthermore, the image recorded in the image recording medium 110 may also be the reconstructed image.

A pixel shift calculating portion 112 calculates a pixel shift amount (corresponding to a resolution of a refocus image) of pixels combined by the reconstruction for a plurality of focus positions based on the image pickup condition information. Then, the pixel shift calculating portion 112 stores the calculation result in one or both of the storage portion 109 and the image recording medium 110 (a step of calculating the pixel shift). The details of the step of calculating the pixel shift will be described below. The image pickup condition information, similarly to the case described above, can be directly obtained from the system controller 111. The information related to the image pickup optical system may also be obtained from the optical system controller 107. The output obtained by using the calculation result stored in the storage portion 109 or the image recording medium 110 may also be displayed on the display portion 106. For example, a high-resolution refocus image is automatically generated, or a high-resolution focus position is displayed so as to inform a user of the focus position. The image pickup apparatus may also be configured so that the focus position of the refocus image can be selected from among high-resolution focus positions by the user.

Thus, the image processing portion 105 generates the output image by performing the reconstruction using the image pickup condition information of the input image for the input image obtained by the image pickup element 103. Series of the controls described above are performed by the system controller 111, and a mechanical drive of the image pickup optical system is performed by the optical system controller 107 based on an instruction of the system controller 111.

Next, referring to FIG. 1, a configuration of the image pickup optical system in the present embodiment will be described. FIG. 1 is a schematic configuration diagram of the image pickup optical system. The image pickup optical system is configured by including an imaging optical system 101, a pupil dividing portion 102 (a lens array 102a), and an image pickup element 103. In the present embodiment, the imaging optical system 101 includes an aperture stop (not shown).

In the present embodiment, the lens array 102a configured by a solid lens is used as the pupil dividing portion 102, but the embodiment is not limited to this and other configurations such as a pinhole array may also be used. In the present embodiment, the lens array 102a is configured by using a plurality of lenses (small lenses), and the small lens is configured by the solid lens. However, the present embodiment is not limited to this, and the lens array 102a may also be configured by using a liquid lens, a liquid crystal lens, a diffractive optical element, or the like. The small lens that constitutes the lens array 102a has surfaces at both sides each having a convex shape. However, the present embodiment is not limited to this, and the small lens may also have the surface at one side having a planar shape and the surface at the other side having a convex shape. However, it is preferred that the surface at the image side of the small lens constituting the lens array 102a has a convex shape. As a result, astigmatism of the lens array 102a is reduced, and an image obtained on the image pickup element 103 is sharpened. Conversely, when the surface at the image side of the small lens does not have a convex shape, the astigmatism is increased and therefore a peripheral region of the image which is formed by each small lens is blurred. When the blurred region of this image is used for the reconstruction processing, there is a case where the image obtained by the reconstruction is not sharply formed. Furthermore, it is preferred that the surface at the object side of the small lens constituting the lens array 102a has a planar shape or a convex shape. As a result, a curvature of the small lens is gentled so as to reduce aberrations, and therefore sharper image can be obtained.

The lens array 102a is disposed at an image side conjugate plane of the imaging optical system 101 with respect to an object plane 201. The ray from the object plane 201 passes through the imaging optical system 101 and the lens array 102a, and then enters the pixels of the image pickup element 103 different from each other in accordance with a position and an angle of the ray on the object plane 201 so as to obtain the light field. The lens array 102a has a role of preventing the ray passing through the different positions on the object plane 201 from entering the same pixel. As a result, in the image pickup element 103, an image in which pixel groups obtained by taking the same region on the object plane 201 from a plurality of points of view are arrayed is obtained. In the configuration illustrated in FIG. 1, three pixels (nine pixels in a two dimension) take the same position on the object plane 201. Therefore, the image pickup optical system of the present embodiment has a two-dimensional spatial resolution that is deteriorated to ⅓ with respect to an image pickup optical system that obtains only a two-dimensional light intensity distribution. This is qualitatively the same even when the number of pixels that take the same position on the object plane 201 is changed.

Figure 5A:
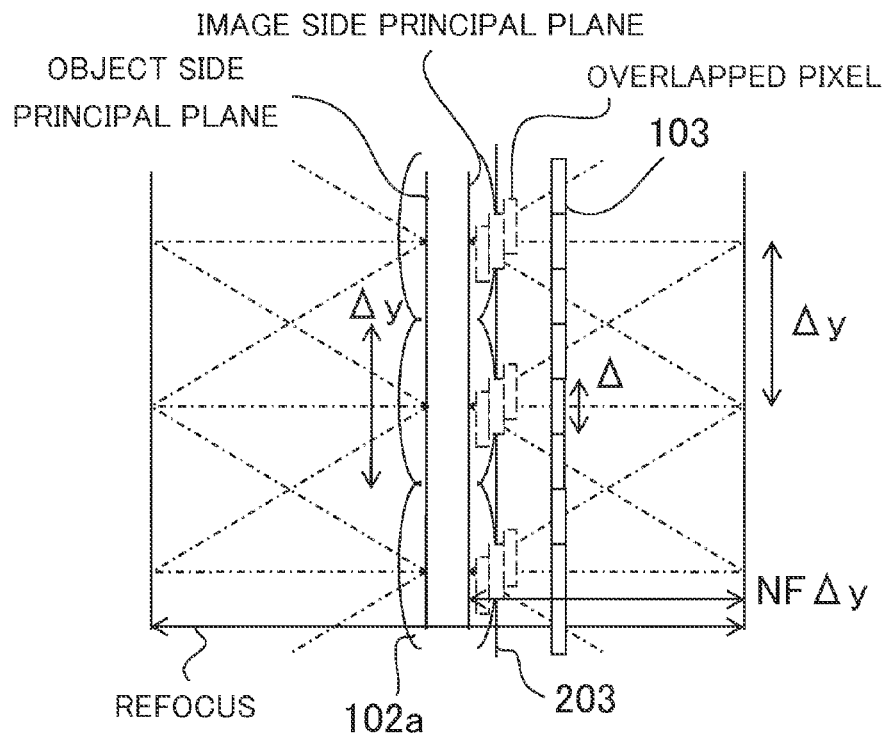
FIGS. 5A and 5B are diagrams of describing a generation of a refocus image in Embodiment 1 or 4.
Figure 5B:
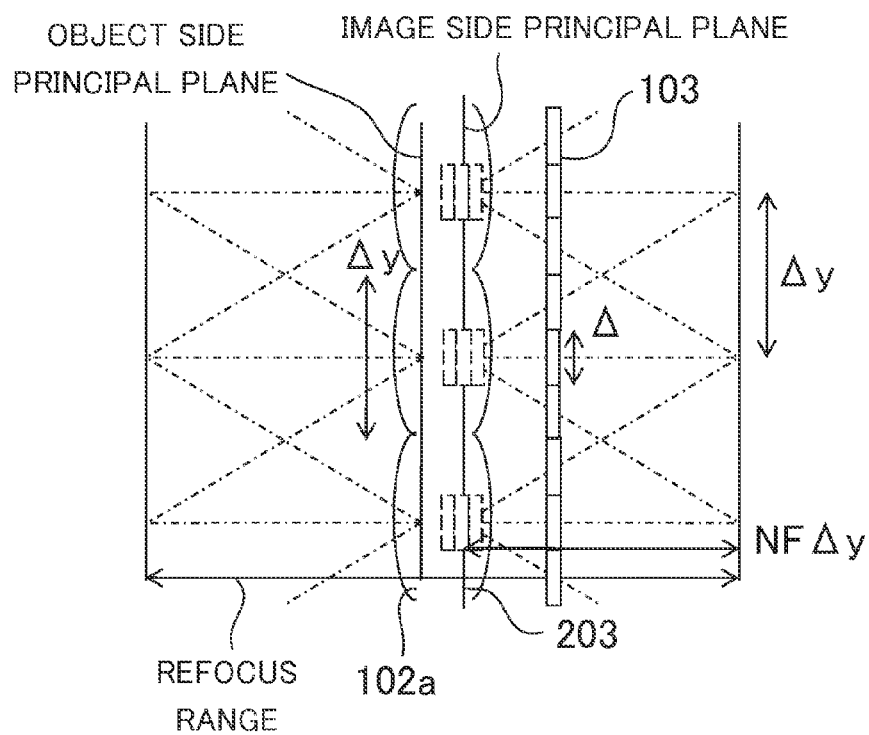

Subsequently, a refocus processing in the present embodiment will be described. With regard to the refocus processing, since details are described in "Fourier Slice Photography" (Ren Ng, 2005, ACM Trans. Graph. 24, 735-744), it is easily described in the embodiment. Referring to FIGS. 5A and 5B, one example of methods of generating a refocus image is described. FIGS. 5A and 5B are diagrams of illustrating parts of the lens array 102a and the image pickup element 103 in the image pickup optical system that is illustrated in FIG. 1 in detail. Dashed-dotted lines in FIGS. 5A and 5B are straight lines of connecting a center of each pixel and an intersection point between a principal plane of the small lens corresponding to this pixel and an optical axis. A virtual imaging plane 203 is an image side conjugate plane of the imaging optical system 101 with respect to a surface at an object side on which the focusing is performed by the refocus processing. However, in the present embodiment, when the image side conjugate plane is positioned at an image side relative to an object side principal plane of the lens array 102a, a surface that is moved to the image side by a principal plane interval of the lens array 102a is the virtual imaging plane 203. A parallel translation is performed for pixel values that are obtained by the image pickup element 103 to move to the virtual imaging plane 203 along the dashed-dotted line so as to combine them, and thus a refocus image can be generated at a desired focus position.

For example, in order to generate an image that is focused on the object plane 201 in FIG. 1, as illustrated in FIG. 5B, the virtual imaging plane 203 may be set to a surface that is conjugate to the object plane 201 via the imaging optical system 101, i.e. the principal plane (the image side principal plane) of the lens array 102a. In FIGS. 5A and 5B, the pixels for which the parallel translation is performed in generating the refocus image are represented by dashed lines, and they are depicted by shifting them instead of overlapping them for easy understanding. As illustrated in FIGS. 5A and 5B, when a pupil region of the imaging optical system 101 through which light beams entering pixels pass is the same in generating an arbitrary refocus image, it is understood that the pixels have the same parallel translation amount. Accordingly, the operation of the pixel at the time of generating the refocus image is determined in accordance with the pupil region of the imaging optical system 101 through which the light beam entering the pixel passes.

Next, a range in which the refocus processing can be performed will be described. Since an opening diameter of the imaging optical system 101 is limited, an angle component of the light field that is obtained by the image pickup element 103, i.e. parallax information, is also limited. Therefore, the range in which the refocus processing can be performed is limited to a finite range. In the embodiment, the two-dimensional light intensity distribution is referred to as a spatial component of the light field. In this case, the refocus range is determined by a sampling pitch $\Delta y$ of the spatial component and a sampling pitch $\Delta u$ of the angle component, and its coefficient $\alpha_\pm$ is given as the following Expression (1).

$$\alpha_\pm = \frac{1}{1 \pm \Delta y / \Delta u} \qquad (1)$$

The refocus range $\alpha_+ s_2 \sim \alpha_- s_2$ at the image side that are represented by using Expression (1) and the conjugate range with respect to the imaging optical system 101 are a refocus range at the object side. In the embodiment, symbol $s_2$ is an interval between the image side principal plane of the imaging optical system 101 and the image side conjugate plane of the imaging optical system 101 with respect to the object plane 201.

Figure 6:
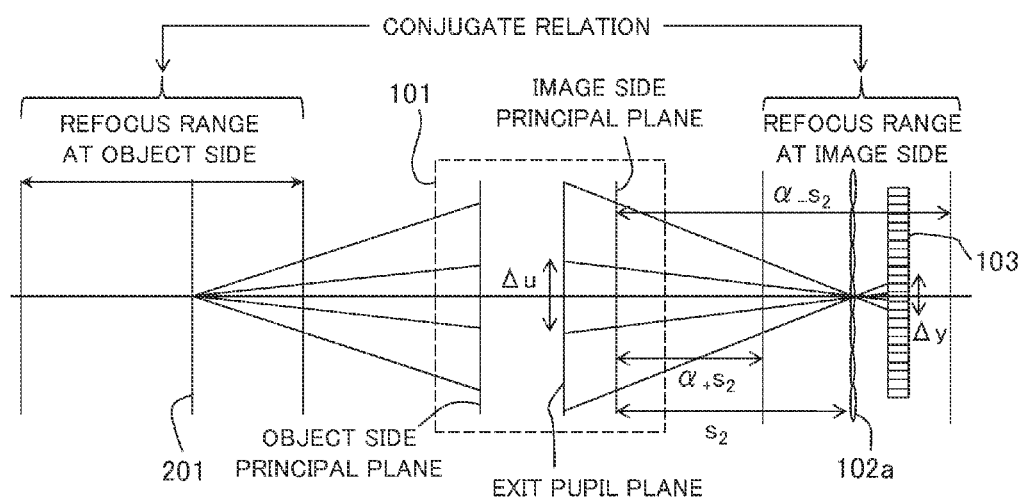
FIG. 6 is a diagram of describing a refocus range in Embodiment 1 or 4.

FIG. 6 is a diagram of describing the refocus range. In a configuration example illustrated in FIG. 6, since a one-dimensional cycle of pixels that take the same position on the object plane 201 is three pixels, the sampling pitch $\Delta y$ of the spatial component is three times as large as a pixel pitch of the image pickup element 103. Since an exit pupil of the imaging optical system 101 is divided into three regions (nine regions in the two dimension), the sampling pitch $\Delta u$ of the angle component is ⅓ of the diameter of the exit pupil. When a range exceeds the refocus range that is represented by Expression (1), the information is insufficient in the obtained light field and a correct refocus image cannot be generated. Since the pixel pitch $\Delta$ of the image pickup element 103 is sufficiently small with respect to a pupil distance P of the imaging optical system 101, Expression (1) can be approximated as represented by the following Expression (2).

$$\alpha_\pm s_2 = s_2 \mp NF\Delta y = s_2 \mp NF\Delta_{LA} \qquad (2)$$

In the embodiment, the pupil distance P of the imaging optical system 101 means a distance between an exit pupil plane of the imaging optical system 101 and the image side conjugate plane of the imaging optical system 101 with respect to the object plane 201. Symbol N denotes a one-dimensional division number of the pupil of the imaging optical system 101, symbol F denotes an F-number of the imaging optical system 101, and symbol $\Delta_{LA}$ denotes a pitch of the lens array 102a. When the pupil dividing portion 102 is a pinhole array or the like, the pitch $\Delta_{LA}$ corresponds to its structural period. When a parallel translation of a pixel group corresponding to a certain small lens is performed along the dashed-dotted line of FIGS. 5A and 5B, the interval of each pixel is larger than the sampling pitch $\Delta y$ at the time of exceeding the maximum refocus amount of Expression (2), and a region where the information lack is generated. In this case, a correct refocus image cannot be generated.

Next, a super-resolution from subpixel shift at the time of the image reconstruction will be described. Referring to FIG. 5A, on the virtual imaging plane 203, pixels for which the parallel translation has been performed are shifted from each other so as to be overlapped (overlapped pixels). Combining these pixels, an apparent pixel size (an apparent pixel pitch) can be reduced. This is called the super-resolution from subpixel shift. On the other hand, as illustrated in FIG. 5B, when the pixels for which the parallel translation has been performed are coincident and overlapped without being shifted from each other, the effect of the super-resolution from subpixel shift cannot be obtained, and a high resolution cannot be obtained. Since the shift of the overlapped pixels changes in accordance with the position of the virtual imaging plane 203 to which the pixel is moved by the parallel translation, the effect of the super-resolution from subpixel shift also changes in accordance with the virtual imaging plane 203.

In the embodiment, a maximum pixel pitch in the apparent pixel pitches that have been decreased by the super-resolution from subpixel shift is defined as determining the resolution of the refocus image. The pixel pitch that determines the resolution is referred to as a maximum value of the apparent pixel pitch. In this case, the number of pixels in one-dimensional direction that take the same region of the object plane 201 is n pixels. Symbol n corresponds to the one-dimensional pupil division number of the imaging optical system 101. When the pixels are shifted by 1/n pixel, the maximum value of the apparent pixel pitch is minimized, and the resolution of the refocus image is the highest.

The state illustrated in FIG. 5A indicates a case of n=3, which is a state where the resolution of the refocus image is the highest since each pixel is shifted by ⅓ on the virtual imaging plane 203. Referring to FIG. 5A, it is understood that four points indicating the focus positions of the refocus image at which the same effect can be obtained exist in the refocus range. On the contrary, when the pixels for which the parallel translation has been performed are coincident and are overlapped with each other as illustrated in FIG. 5B, the super-resolution from subpixel shift cannot be performed. Accordingly, calculating a pixel shift amount corresponding to the virtual imaging plane 203, a relation between the virtual imaging plane 203 and the resolution of the refocus image which focuses on its position can be known.

Figure 7:
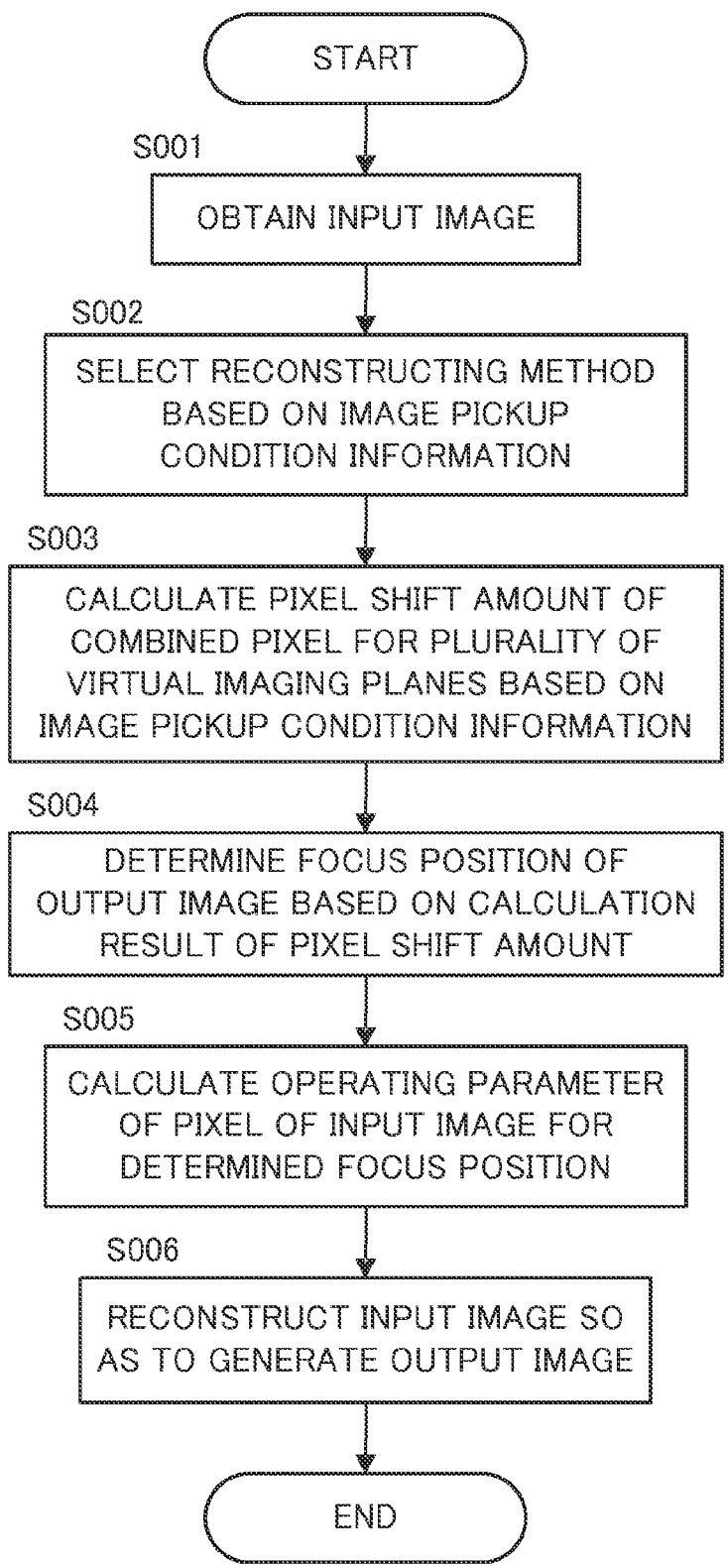
FIG. 7 is a flowchart of illustrating an image processing method in Embodiment 1 or 2.

As above, the configuration of the image pickup optical system in the present embodiment, the generation of the refocus image, and the resolution have been described. Next, referring to FIG. 7, an image processing method that generates an output image from an input image will be described. FIG. 7 is a flowchart of the image processing method in the present embodiment. Each step in the flowchart of FIG. 7 is performed by the image processing portion 105.

First of all, in Step S001, the image processing portion 105 obtains an input image that is taken by the image pickup optical system illustrated in FIG. 1. In other words, the image processing portion 105 obtains the input image that is an image containing information of an object space obtained from a plurality of points of view using the image pickup apparatus having the imaging optical system 101. A type of the input image changes in accordance with the configuration of the image pickup optical system. In the present embodiment, the input image is an image configured by arraying pixel groups that are obtained by taking the same region on the object plane 201 from the plurality of points of view. Alternatively, the input image may be an image that is taken by a similar image pickup optical system and that is stored in the image recording medium 110.

Subsequently, in Step S002, the image processing portion 105 determines a method of reconstructing the image based on image pickup condition information (information related to the configuration of the image pickup optical system) that are contained in the input image. Since the image pickup optical system of the present embodiment includes the configuration as illustrated in FIG. 1, the method of generating the refocus image illustrated in FIGS. 5A and 5B is used as the method of reconstructing the image. However, as long as a method is qualitatively the same as the method of generating the refocus image illustrated in FIGS. 5A and 5B, the details of the method of reconstructing the image may also be different. When the image pickup optical system has the configuration of FIG. 2, 3, or another configuration, a method of reconstructing the image that is different in accordance with its configuration is used. However, when the configuration of the image pickup optical system does not change, a single method is used as the method of reconstructing the image, and Step S002 does not need to be performed.

Next, in Step S003, the image processing portion 105 (the pixel shift calculating portion 112) calculates the pixel shift amount of the combined pixel at the time of generating the refocus image for a plurality of virtual imaging planes 203 based on the image pickup condition information. In other words, the image processing portion 105 calculates the pixel shift amount of the pixels that are combined by the reconstruction with respect to a plurality of virtual imaging plane corresponding to a plurality of focus positions. The position of the calculated virtual imaging plane 203 is, for example, determined by dividing a refocus range at the image side or a refocus range at the object side into regions with equal pitches. However, the present embodiment is not limited to this, and the position may be selected for each object distance of an object that exists in the input image or may also be arbitrarily selected within the refocus range. Step S003 corresponds to a pixel shift calculating step.

Subsequently, in Step S004, the image processing portion 105 determines the focus position of the output image based on the result calculated in Step S003 (the shift amount of the combined pixel at the time of generating the refocus image). As a method of determining the focus position, a method of selecting a high-resolution virtual imaging plane 203 where the great effect of the super-resolution from subpixel shift is obtained is considered to be used. As described above, the effect of the resolution is maximized on the virtual imaging plane 203 where the combined pixels are shifted by 1/n pixel when the number of pixels which take an image of the same position of the object plane 201 in one-dimensional direction is n (n pixels).

Referring to FIG. 5, specifically, the positions are four points of $s_2 \pm F\Delta$ and $\alpha_\pm s_2 \pm F\Delta$. If the focus position of the output image is selected from these four points, a high-resolution refocus image can be obtained. When a diameter of a permissible circle of confusion is defined as $\epsilon$, a depth of focus of the imaging optical system 101 is approximately represented by $F\epsilon$. Accordingly, a high-resolution focus point may also be selected within the range of $s_2 \pm F\epsilon$. Since the relation of $\epsilon \geq \Delta$ is satisfied, the points $s_2 \pm F\Delta$ that is the focus positions where the effect of the super-resolution from subpixel shift is maximized is definitely within the range of $s_2 \pm F\epsilon$. Furthermore, the focus position of the output image may also be determined in a range represented by the following Conditional Expression (3).

$$0.5 \leq \frac{|\rho - s_2|}{F\Delta} \leq 2.0 \quad (3)$$

In Conditional Expression (3), a range of $s_2-\sigma_2 \leq \rho \leq s_2+\sigma_2$ is satisfied. Symbol $\rho$ denotes a distance between the image side principal plane of the imaging optical system 101 and the image side conjugate plane of the imaging optical system 101 for the surface at the object side to be focused by the refocus, and symbol $\sigma_2$ denotes a distance between the image side principal plane of the lens array 102a and the image pickup element 103. Conditional Expression (3) indicates a level of the effect of the super-resolution from subpixel shift. Symbol $\sigma_2/(F\Delta)$ denotes a number of pixels that take an image at the same position of the object plane 201 in the one-dimensional direction, and symbol $|(\rho-s_2)/\sigma_2|$ denotes a ratio of a shift of pixels to be combined. At the position $s_2 \pm F\Delta$, a value of Conditional Expression (3) is 1, which indicates that the effect of the super-resolution from subpixel shift is maximized. The effect of the super-resolution from subpixel shift is weakened as the value of Conditional Expression (3) is distant from 1, and a sufficient effect of the super-resolution from subpixel shift cannot be obtained if the value exceeds the upper limit or the lower limit of Conditional Expression (3).

Furthermore, it is preferred that Conditional Expression (3) is set to a range that satisfies the following Conditional Expression (3a) so as to obtain the refocus image with higher resolution.

$$0.75 \leq \frac{|\rho - s_2|}{F\Delta} \leq 1.5 \quad (3a)$$

Setting the range of Conditional Expression (3a), when n is especially small, the output image has a high resolution. For example, a case where the F-number of the imaging optical system 101 is 2.0, a focal length f is 50 mm, and the pixel pitch $\Delta$ of the image pickup element 103 is 0.006 mm is considered. When the distance between the object plane 201 and the object side principal plane of the imaging optical system 101 is 2500 mm, the value of $s_2$ is 51.0204 mm. In this case, when $\rho=51.0300$ (mm) is satisfied, the value of Conditional Expression (3) is 0.8, and a high-resolution refocus image can be outputted.

The focus position of the output image may also be a focus position which is designated by a user. In this case, since the user recognizes the result calculated in Step S003, the user can designate a desired focus position based on the result. Instead of this, the focus position may also be selected by the user from among the high-resolution focus positions obtained by the calculation.

Next, in Step S005, in order to generate the output image at the focus position determined in Step S004, the image processing portion 105 calculates an operating parameter by which the pixel of the input image is operated. In the present embodiment, since the method of generating the refocus image described above is used, the operating parameter is a parallel moving amount of the pixel.

Subsequently, in Step S006, the image processing portion 105 reconstructs the input image using the parallel moving amount calculated in Step S005 so as to generate the output image. In other words, the image processing portion 105 generates the output image at the focus position determined based on the pixel shift amount. Step S006 corresponds to an image generating step. The generated output image is outputted to the display portion 106 or is stored in the image recording medium 110.

In needed, the reconstruction processing that changes the point of view or the depth of field may also be performed along with the refocus processing. In addition, when the reconstruction processing of the image is performed, further higher-resolution is achieved by using an image estimation such as MAP (Maximum a posteriori) as well.

In the configuration described above, according to the present embodiment, an image processing method, an image pickup apparatus, an image processing apparatus, and a non-transitory computer-readable storage medium that stores an image processing program capable of calculating a focus position at which a high-resolution refocus image is obtained can be provided.

Embodiment 2

Next, Embodiment 2 of the present invention will be described. A basic configuration of an image pickup apparatus in the present embodiment is the same as that of the image pickup apparatus of Embodiment 1 described with reference to FIG. 4, and therefore descriptions thereof will be omitted.

Subsequently, referring to FIG. 2, a configuration of an image pickup optical system in the present embodiment will be described. FIG. 2 is a schematic configuration diagram of the image pickup optical system. The lens array 102a is disposed at the object side relative to an image side conjugate plane 202 of the imaging optical system 101 with respect to the object plane 201, and the image side conjugate plane 202 and the image pickup element 103 are disposed so as to conjugate to each other via the lens array 102a. A ray from the object plane 201 passes through the imaging optical system 101 and the lens array 102a, and then enters pixels of the image pickup element 103 different from each other in accordance with a position and an angle of the ray on the object plane 201 so as to obtain the light field. As a result, the image pickup element 103 obtains an image that is configured by a plurality of arrayed small images which have different shot points of view and shot ranges.

The image pickup optical system illustrated in FIG. 2 has a deteriorated spatial resolution compared to the image pickup optical system which obtains only the two-dimensional light intensity distribution. This is because an image that is formed by the imaging optical system 101 is viewed as an imaginary object by the lens array 102a so that it is reduced to be imaged on the image pickup element 103. The reduction magnification is $|\sigma_2/\sigma_1|$ times. Symbol $\sigma_1$ denotes a distance between the image side conjugate plane 202 and the object side principal plane of the lens array 102a, and symbol $\sigma_2$ denotes a distance between the image side principal plane of the lens array 102a and the image pickup element 103. Therefore, the image pickup optical system illustrated in FIG. 2 has two-dimensional spatial resolution improved by $(\sigma_2/\sigma_1)^2$ times with respect to the image pickup optical system which obtains only the two-dimensional light intensity distribution.

Figure 8A:
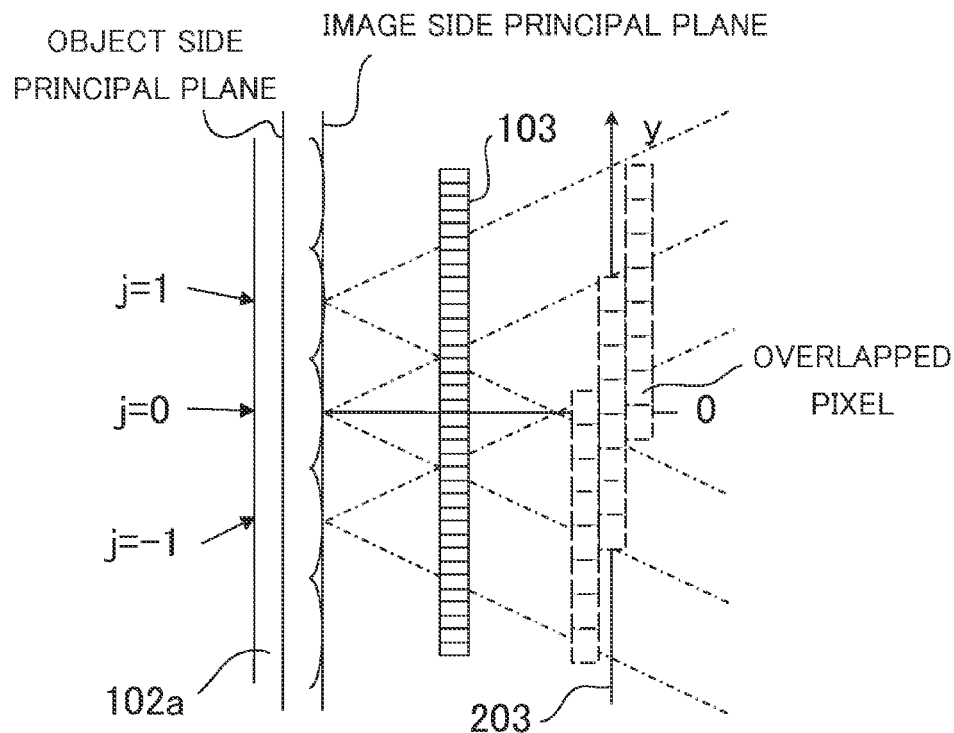
FIGS. 8A and 8B are diagrams of describing a generation of a refocus image in Embodiment 2 or 5.
Figure 8B:
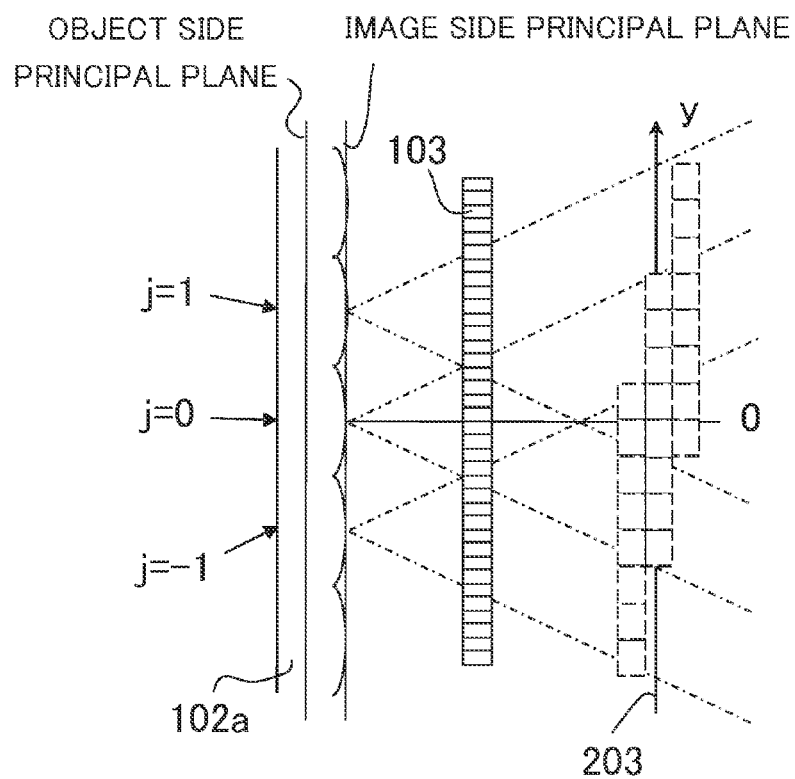

Next, referring to FIGS. 8A and 8B, a method of generating the refocus image in the present embodiment will be described. FIGS. 8A and 8B are detailed diagrams of parts of the lens array 102a and the image pickup element 103 in the configuration of the image pickup optical system illustrated in FIG. 2. In the present embodiment, the lens array 102a is configured by a small lens that has a surface at the object side having a planar shape and that has a surface at the image side having a convex shape. However, similarly to Embodiment 1, the shape of the lens array 102a is not limited to this.

Dashed-dotted lines in FIGS. 8A and 8B indicate an angle of view of each small lens. A pixel value that is obtained by the image pickup element 103 is projected and combined on the virtual imaging plane 203 via the small lens corresponding to the pixel so that the refocus image that is focused on the virtual imaging plane 203 can be generated. For example, in order to generate the image that is focused on the object plane 201 in FIG. 2, the virtual imaging plane 203 may be set on the image side conjugate plane 202. In FIGS. 8A and 8B, pixels that are projected when generating the refocus image is represented by dashed lines, and for easy understanding they are depicted by being shifted without being overlapped with each other. The refocus image may also be generated by using a method of combining each pixel while performing a parallel translation of each pixel so that pixels are overlapped with each other similarly to the case of the generating method by projecting the pixels described above. In this case, when regions of the lens array 102a through which the light beams entering the pixels pass are the same, amounts of the parallel translation of the pixels are the same. As described above, the operation of the pixels when generating the refocus image in the present embodiment is determined in accordance with the region of the lens array 102a through which the light beam entering the pixel passes.

Figure 9:
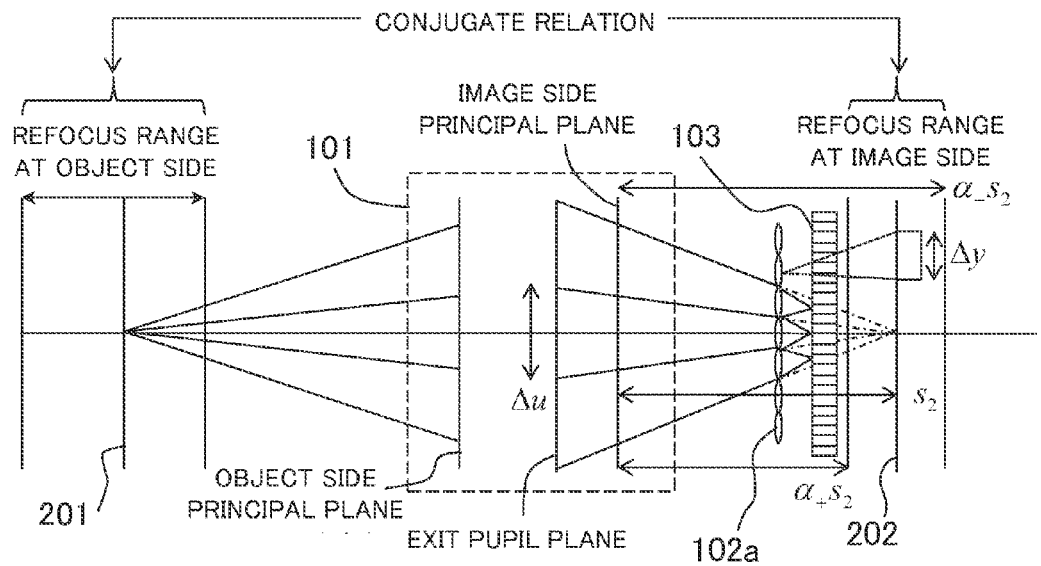
FIG. 9 is a diagram of describing a refocus range in Embodiment 2 or 5.

Subsequently, a range in which the refocus can be performed will be described. The refocus range of the image pickup optical system in the present embodiment is also represented by Expression (1), similarly to Embodiment 1. The relationship is as illustrated in FIG. 9. FIG. 9 is a diagram of describing the refocus range in the present embodiment. In the image pickup optical system in the present embodiment, since $\Delta y = \Delta |\sigma_1/\sigma_2|$ and $\Delta u = P/(NF)$ are satisfied and $\Delta \ll P$ is also satisfied, Expression (1) is rewritten by the following Expression (4).

$$\alpha_+ s_2 = s_2 \mp NF\Delta y = s_2 \mp NF\Delta\sigma_1/\sigma_2 \qquad (4)$$

In Expression (4), symbol A is a pixel pitch of the image pickup element 103. Similarly to Embodiment 1, when a value exceeds the range of Expression (4), a correct refocus image cannot be generated.

Next, the improvement of the spatial resolution by the super-resolution from subpixel shift will be described. As illustrated in FIG. 8A, the pixels which are projected on the virtual imaging plane 203 are overlapped with each other. The number of the overlapped pixels is referred to as an overlap number of the pixels. As illustrated in FIG. 8A, when the projected pixels are shifted from each other, they can be combined so as to decrease the apparent pixel pitch. On the other hand, as illustrated in FIG. 8B, when the shift of the projected pixels is an integral multiple of the pixel, the effect of the super-resolution from subpixel shift cannot be obtained. When a ratio of the shift of the pixels corresponds to the overlap number of the pixels, the highest resolution can be obtained by the super-resolution from subpixel shift. Specifically, since the overlap number of the pixels is 3 in the case of FIG. 8A, the highest resolution can be obtained when the ratio of the pixel shift is 1/3 or 2/3. The relationship between the ratio of the pixel shift and the overlap number of the pixels will be described below in detail. As above, also in the present embodiment, the effect of the super-resolution from subpixel shift is changed in accordance with the virtual imaging plane 203. Accordingly, calculating the pixel shift amount corresponding to the focus position of the refocus image, various kinds of processings for improving the resolution can be performed.

Next, in the present embodiment, an image processing method of generating the output image from the input image will be described. The image processing method of the present embodiment is represented by a flowchart of FIG. 7, and descriptions of the same parts as those of Embodiment 1 is omitted.

First of all, in Step S001, the image pickup element 103 obtains an image that is configured by the plurality of arrayed small images which have different shot points of view and shot ranges. After the reconstructing method is selected in Step S002, in Step S003, a shift amount of the combined pixels in generating the refocus image is calculated for a plurality of virtual imaging planes 203 based on the image pickup condition information. The ratio of the pixel shift in the present embodiment is represented by a ratio $\Delta_{LA}\sigma_2/(\Delta\tau)$ that is obtained by dividing $\Delta_{LA}$ by the pitch of the pixels projected on the virtual imaging plane 203. Symbol $\tau$ denotes a distance between the object side principal plane of the imaging optical system and the virtual imaging plane 203. Furthermore, since the shift of the integral multiple of the pixels is meaningless as illustrated in FIG. 8B, an integer part does not need to be considered. Accordingly, a ratio $\delta$ of the pixel shift is represented as the following Expression (5).

$$\delta = \mathrm{mod}\left(\frac{\Delta_{LA}\sigma_2}{\Delta\tau}, 1\right) \qquad (5)$$

In Expression (5), z=mod(x,y) denotes that z is equal to a remainder obtained by dividing x by y.

Figure 10:
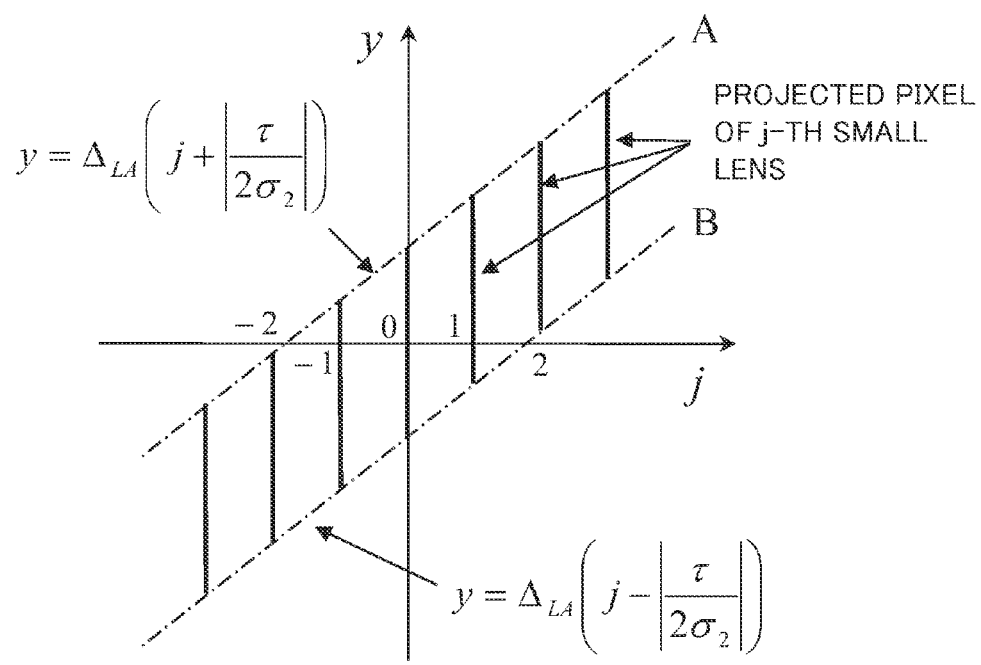
FIG. 10 is a diagram of describing an overlap number of pixels in Embodiment 2 or 5.

Next, in Step S004, the focus position of the output image is determined based on the result calculated in Step S003. As the determining method, similarly to Embodiment 1, a method of selecting the virtual imaging plane 203 where the effect of the super-resolution from subpixel shift is improved so as to obtain the high resolution is adopted. Therefore, specifically the virtual imaging plane 203 with high resolution is obtained. First of all, the overlap number of the pixels on the virtual imaging plane 203 is estimated. FIG. 10 is a diagram of describing the overlap number of the pixels, which is a graph that has a horizontal axis indicating the number j of the small lens illustrated in FIG. 8A and that has a vertical axis indicating a coordinate y on the virtual imaging plane 203. In the embodiment, j=0 may be an arbitrary small lens of the lens array 102a. Each of straight lines parallel to a y-axis in FIG. 10 represents a coordinate that is obtained when the pixel group corresponding to the j-th small lens is projected on the virtual imaging plane 203. A dashed-dotted line A connects the upper limits of these straight lines, and a dashed-dotted line B connects the lower limits of the straight lines. The dashed-dotted line A is given by $y=\Delta_{LA}\{j+|\tau/(2\sigma_2)|\}$, and the dashed-dotted line B is given by $y=\Delta_{LA}\{j-|\tau/(2\sigma_2)|\}$. The overlap number of the pixels corresponds to an interval between the dashed-dotted lines A and B in a j direction. The overlap number of the pixels that correspond to j=0 is the minimum for pixels near y=0, and the overlap number can be estimated at around $|\tau/\sigma_2|$.

Subsequently, the spatial resolution including the super-resolution from subpixel shift is obtained. As described above, the resolution is the highest when the overlap number of the pixels and the ratio $\delta$ of the pixel shift represented by Expression (5) correspond to each other. For example, when the overlap number of the pixels is 8 and the ratio δ of the pixel shift is 0.45, the pixel shifts of the eight pixels are 0, 0.45, 0.90, 0.35, 0.80, 0.25, 0.70, and 0.15, respectively. In this case, the maximum value of the apparent pixel pitch that determines the resolution is 0.70−0.45=0.25. Next, a case in which the overlap number is the same and the ratio δ of the pixel shift is 3/8 will be considered. In this case, the pixel shifts of the eight pixels are 0, 3/8, 6/8, 1/8, 4/8, 7/8, 2/8, and 5/8, respectively. The maximum value of the apparent pixel pitch is 1/8, which is equal to an inverse of the overlap number of the pixels. Accordingly, the maximum effect of the super-resolution from subpixel shift is obtained. The same is true for any one of cases in which the ratio δ of the pixel shift is 1/8, 5/8, and 7/8.

However, when the ratio δ of the pixel shift is any one of 2/8, 4/8, and 6/8, the effect of the super-resolution from subpixel shift is deteriorated. For example, a case in which the ratio δ of the pixel shift is 2/8 is considered. In this case, the pixel shifts of the eight overlapped pixels are 0, 2/8, 4/8, 6/8, 0, 2/8, 4/8, and 6/8, respectively, and the maximum value of the apparent pixel pitch is 2/8=1/4 since the pixels are overlapped with each other. Accordingly, the effect of the super-resolution from subpixel shift is half of the case in which the ratio δ of the pixel shift is any one of 1/8, 3/8, 5/8, and 7/8.

Thus, when the ratio δ of the pixel shift is equal to $m_0/M_0$, the maximum effect of the super-resolution from subpixel shift can be obtained. Symbol $M_0$ denotes the overlap number of pixels, and symbol $m_0$ denotes an integer that is smaller than $M_0$ and that has the greatest common divisor of 1 for $M_0$. As described above, $M_0$ can be estimated at around $\tau/\sigma_2$, and the effect of the super-resolution from subpixel shift is improved as the ratio δ of the pixel shift is close to $m_0/M_0$.

As above, the focus position of the output image may also be determined in a range that satisfies the following Conditional Expression (6).

$$0.9 < \frac{M}{m}\mathrm{mod}\left(\frac{\Delta_{LA}\sigma_2}{\Delta\tau}, 1\right) < 1.1 \tag{6}$$

In Conditional Expression (6), symbol M denotes an integer that satisfies the following Conditional Expression (7).

$$0.2 < \frac{M}{\tau/\sigma_2} < 2.0 \tag{7}$$

Symbol m denotes an integer that is smaller than the integer M and that has the greatest common divisor of 1 for the integer M. Conditional Expressions (6) and (7) represent a level of the effect of the super-resolution from subpixel shift, and a high-resolution refocus image can be obtained by satisfying Conditional Expressions (6) and (7). When values exceed the upper limits or the lower limits of Conditional Expressions (6) and (7), the effect of sufficient super-resolution from subpixel shift cannot be obtained, and therefore the improvement of the spatial resolution is insufficient.

It is preferred that Conditional Expression (6) is set to a range that satisfies the following Conditional Expression (6a) so as to obtain the refocus image with higher resolution.

$$0.93 < \frac{M}{m}\mathrm{mod}\left(\frac{\Delta_{LA}\sigma_2}{\Delta\tau}, 1\right) < 1.07 \tag{6a}$$

It is more preferred that Conditional Expression (6) is set to a range that satisfies the following Conditional Expression (6b) so as to obtain the refocus image with further higher resolution.

$$0.95 < \frac{M}{m}\mathrm{mod}\left(\frac{\Delta_{LA}\sigma_2}{\Delta\tau}, 1\right) < 1.05 \tag{6b}$$

It is preferred that Conditional Expression (7) is set to a range that satisfies the following Conditional Expression (7a) and more preferably Conditional Expression (7b) so as to obtain the refocus image with higher resolution.

$$0.4 < \frac{M}{\tau/\sigma_2} < 1.6 \tag{7a}$$

$$0.6 < \frac{M}{\tau/\sigma_2} < 1.4 \tag{7b}$$

For example, a case where the pitch $\Delta_{LA}$ of the lens array 102a is 4.3559 (mm), the pixel pitch Δ of the image pickup element 103 is 0.0043 (mm), $\sigma_1$ is 37.7657 (mm), and $\sigma_2$ is 5.4325 (mm) is considered. In this case, when τ is 37.8000 (mm), the value of Conditional Expression (6) is 1.02, and the value of Conditional Expression (7) is 1.0. In the embodiment, M is equal to 7 and m is equal to 4. As a result, a high-resolution refocus image is automatically generated.

Similarly to Embodiment 1, the focus position of the output image may also be a focus position designated by a user. In this case, since the user recognizes the result calculated in Step S003, the user can designate a desired focus position based on the result.

In Step S005 of FIG. 7, in order to generate the output image at the focus position determined in Step S004, the operating parameter of the pixel is calculated. When the method of generating the refocus image described with reference to FIGS. 8A and 8B is used, the operating parameter is a magnification of enlarging the pixel. The refocus image may also be generated by the parallel movement of the pixel so that the same result as that of a case where the pixel is enlarged and combined can be obtained. The operating parameter in this case is the parallel moving amount.

In the configuration described above, according to the present embodiment, an image processing method, an image pickup apparatus, an image processing apparatus, and a non-transitory computer-readable storage medium that stores an image processing program capable of calculating a focus position at which a high-resolution refocus image is obtained can be provided.

Embodiment 3

Figure 11:
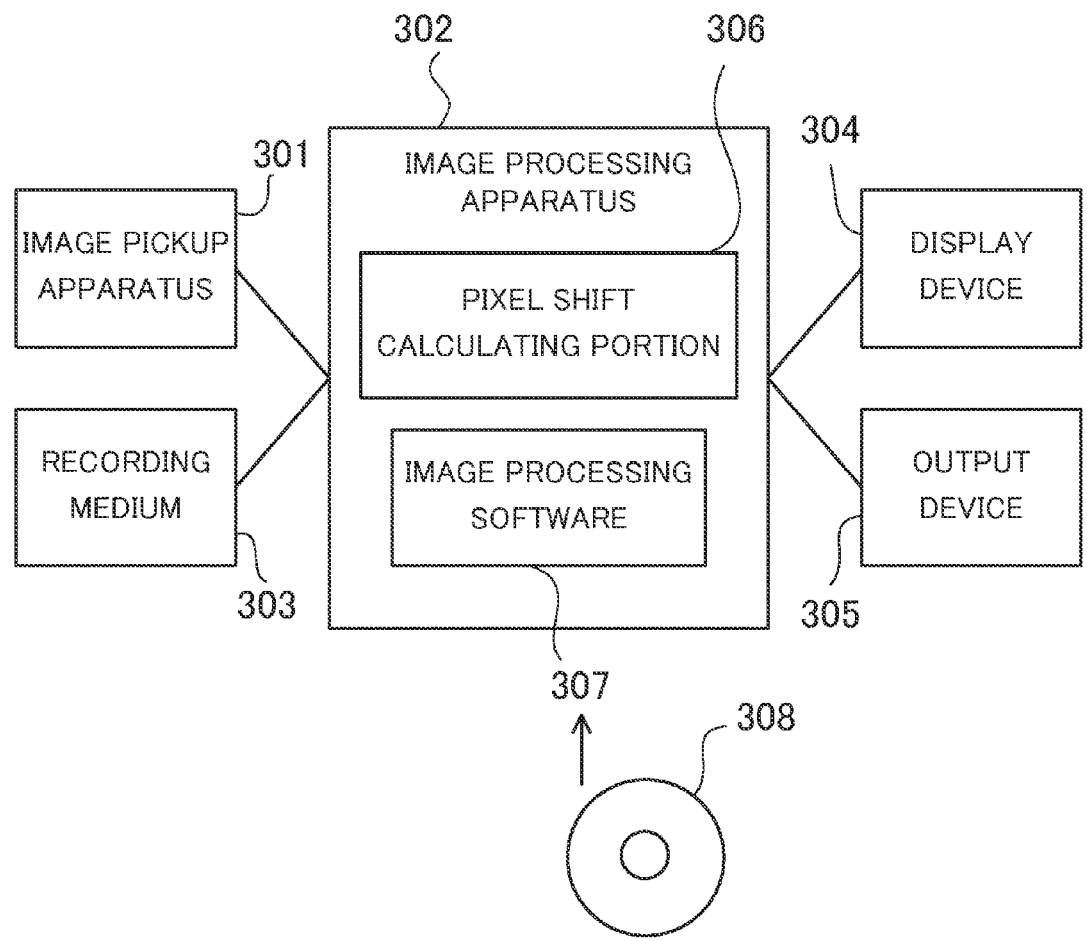
FIG. 11 is a diagram of describing an image processing system in Embodiment 3.

Next, Embodiment 3 of the present invention will be described. The present embodiment describes an image processing apparatus (an image processing system) that performs the image processing method described above. FIG. 11 is a block diagram of the image processing system in the present embodiment.

As illustrated in FIG. 11, the image processing system includes an image pickup apparatus 301. For example, the image pickup apparatus 301 includes the image pickup optical system illustrated in FIG. 3. An image processing apparatus 302 is a computer device (an information processing apparatus) that performs the pixel shift calculating step and the image generating step described above. The image processing apparatus 302 performs the image generating step in which the reconstruction depending on the configuration of the image pickup apparatus 301 for an image obtained by the image pickup apparatus 301 is performed so as to generate the output image. The result of the image generating step is outputted to any one of or a plurality of a storage medium 303, a display device 304, and an output device 305. The storage medium 303 is, for example a semiconductor memory, a hard disk, or a server on a network. The display device 304 is, for example, a liquid crystal display or a projector. The output device 305 is for example a printer. The display device 304 is connected to the image processing apparatus 302, and the reconstructed image is inputted to the display device 304. A user can work while confirming the reconstructed image via the display device 304.

The image processing apparatus 302 is configured by including a pixel shift calculating portion 306 and image processing software 307. The pixel shift calculating portion 306 performs the pixel shift calculating step. The pixel shift calculating step is a step of calculating the pixel shift amount for the plurality of virtual imaging plane 203 based on the reconstructing method depending on the configuration of the image pickup optical system described above. The image processing software 307 (an image processing program) performs a development processing and other image processings if needed, as well as the reconstruction processing (the image processing method) described above.

The present embodiment can also be achieved by performing the following processing. In other words, it is a processing in which software (a program) that achieves the function described above is provided to the system or the apparatus via a network or a storage medium 308 (a non-transitory computer-readable storage medium) such as a CD-ROM so that a computer (a CPU, an MPU, or the like) of the system or the apparatus can read the program to be executed.

The image pickup optical system that constitutes the image pickup apparatus 301 of the present embodiment is arranged as illustrated in FIG. 3. The image pickup optical system of the present embodiment illustrated in FIG. 3 is the same as the configuration of Embodiment 2 illustrated in FIG. 2, except that the lens array 102a is disposed at the image side relative to the image side conjugate plane 202. A configuration of the present embodiment (FIG. 3) is different from the configuration of Embodiment 2 (FIG. 2) in that the lens array 102a views an image formed by the imaging optical system 101 as a real object so as to reconstruct it on the image pickup element 103. However, the configuration of FIG. 2 and the configuration of FIG. 3 are essentially the same since the lens array 102a views the image that is imaged by the imaging optical system 101 as an object so as to form the image on the image pickup element 103. Accordingly, a method of generating the refocus image of the present embodiment is the same as that of Embodiment 2.

Figure 12:
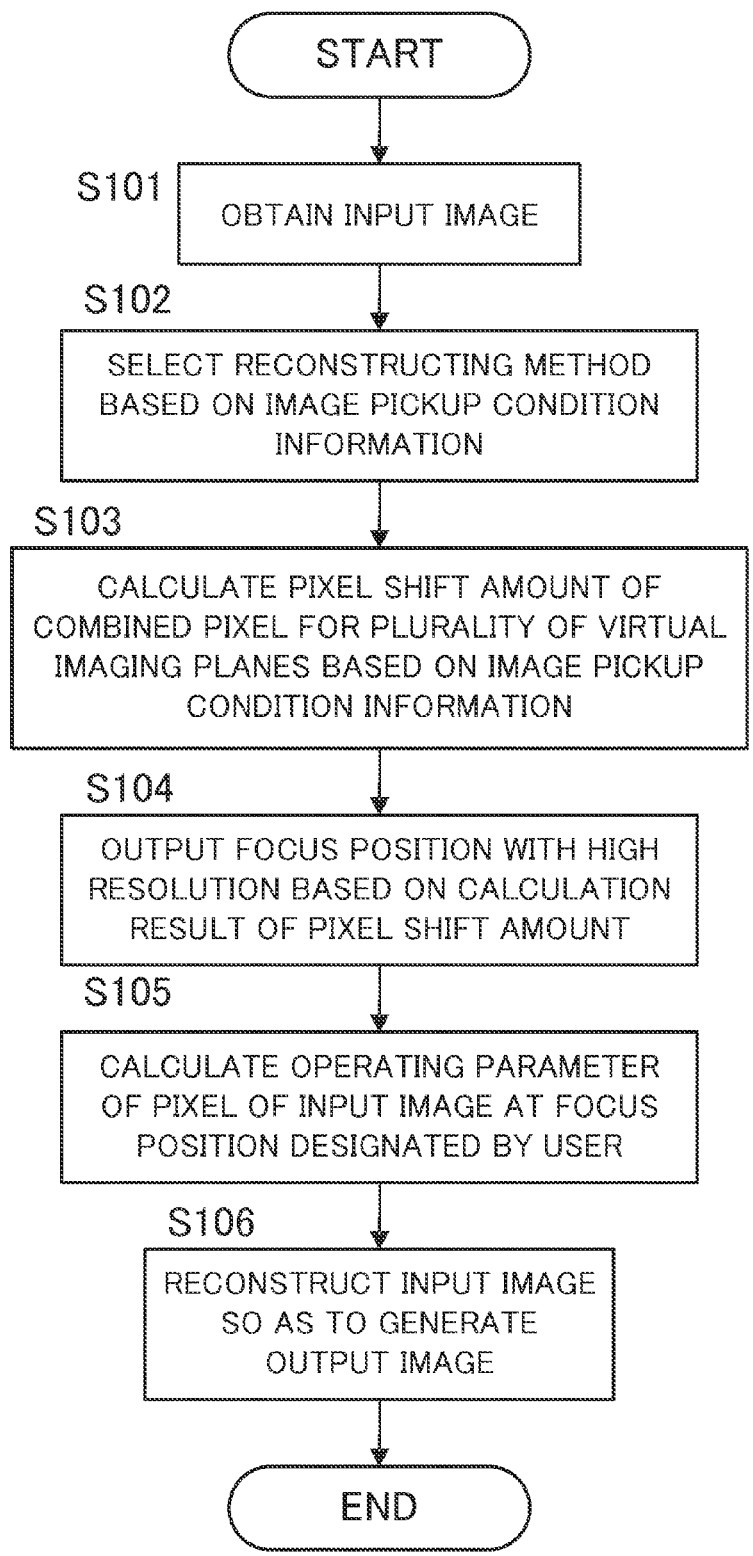
FIG. 12 is a flowchart of illustrating an image processing method in Embodiment 3.

Next, referring to FIG. 12, an image processing method that generates the output image from the input image will be described. FIG. 12 is a flowchart of the image processing method in the present embodiment. Each step of FIG. 12 is performed by the image processing apparatus 302.

First of all, in Step S101, the image processing apparatus 302 (the image processing portion) obtains an image obtained by the image pickup apparatus 301 of FIG. 11 as an input image. The input image is stored in an internal memory (a storage portion) of the image processing apparatus 302 or the like. Subsequently, in Step S102, the image processing apparatus 302 reads image pickup condition information (information related to a configuration of the image pickup optical system) from the input image or the image pickup apparatus 301. The image pickup condition information is stored in the internal memory of the image processing apparatus 302, and the image processing apparatus 302 determines a method of reconstructing the image based on the image pickup condition information. The image pickup optical system in the present embodiment has the configuration illustrated in FIG. 3, which can generate a refocus image using the reconstructing method similar to that of Embodiment 2.

Next, in Step S103, the image processing apparatus 302 calculates a shift amount of a combined pixel at the time of generating the refocus image for a plurality of virtual imaging plane 203 based on the image pickup condition information. In other words, the image processing apparatus 302 calculate a pixel shift amount of the pixels combined by the reconstruction for the plurality of virtual imaging plane corresponding to a plurality of focus positions. Then, in Step S104, the image processing apparatus 302 obtains a focus position where a high-resolution image is obtained based on a result (the pixel shift amount) calculated in Step S103, and outputs the result. The output result is for example outputted to the display device 304 or the output device 305, and the user can designate the focus position of the refocus image that is to be generated with reference to the result.

Subsequently, in Step S105, in order to generate the output image at the focus position which is designated by the user, the image processing apparatus 302 calculates an operating parameter of the pixel of the input image. The operating parameter is the same as that of Embodiment 2. Then, in Step S106, the image processing apparatus 302 reconstructs the input image using the operating parameter calculated in Step S105 so as to generate the output image. The generated output image is outputted to one or a plurality of the storage medium 303, the display device 304, and the output device 305. In the present embodiment, the image processing apparatus 302 may also generate the refocus image at a specific focus position so as to be outputted to the display device 304 or the output device 305 before Step S104. The focus position may also be determined based on the image side conjugate plane 202 or the calculation result in Step S103 as described in Embodiments 1 and 2.

In the configuration described above, according to Embodiments 1 to 3, an image processing method, an image pickup apparatus, an image processing apparatus, and a non-transitory computer-readable storage medium that stores an image processing program capable of calculating a focus position at which a high-resolution refocus image is obtained can be provided.

Embodiment 4

Figure 13:
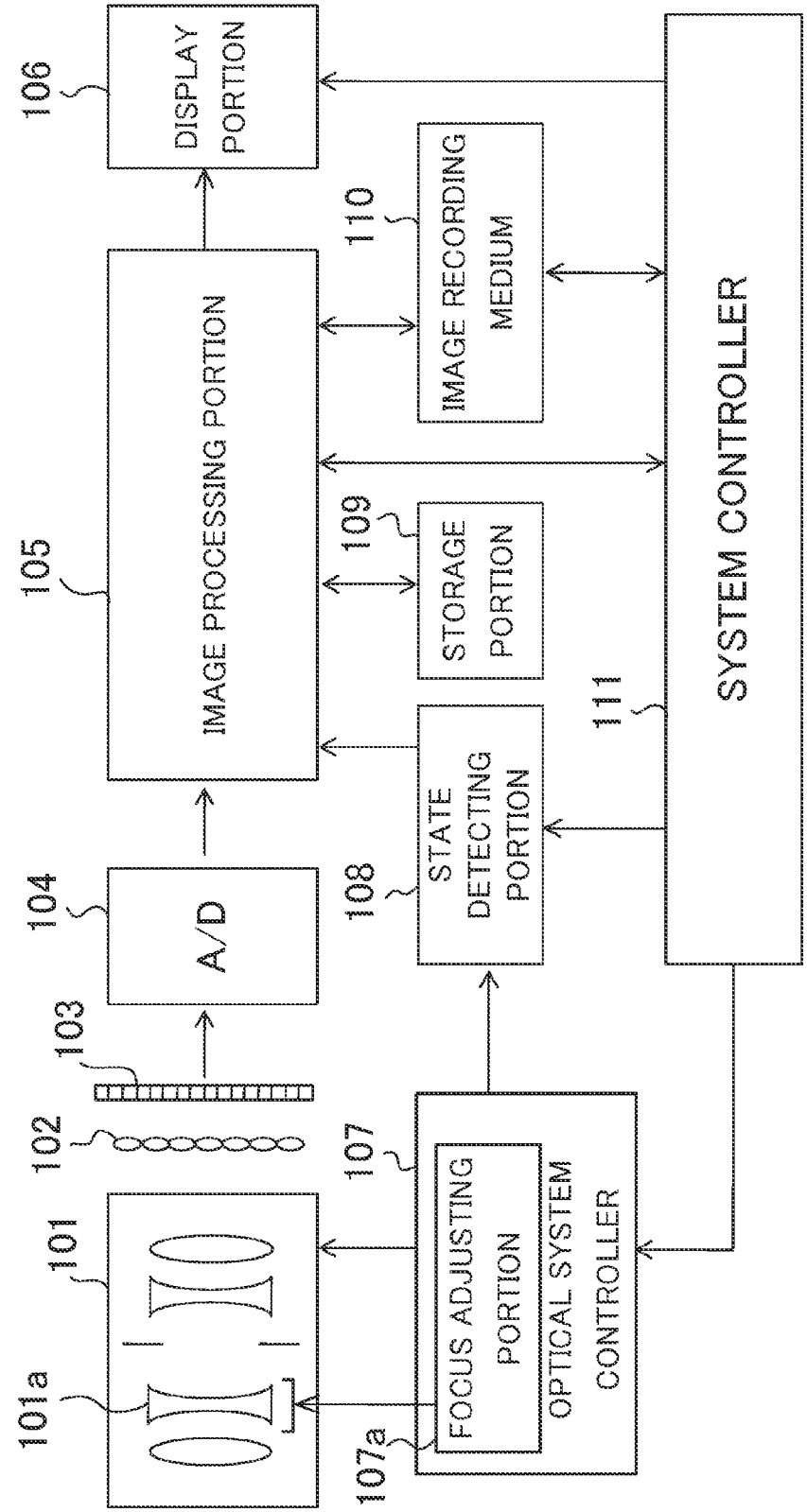
FIG. 13 is a block diagram of an image pickup apparatus in Embodiment 4 or 5.

Next, referring to FIG. 13, a configuration of an image pickup apparatus in Embodiment 4 of the present invention will be described. FIG. 13 is a block diagram of the image pickup apparatus in the present embodiment. An image processing method of the present embodiment is performed by an image processing portion 105 of the image pickup apparatus.

A pupil dividing portion 102 enables a ray from the same position on an object plane to enter pixels of an image pickup element 103 which are different from each other in accordance with a pupil region of an imaging optical system 101 where the ray passes. An image pickup optical system is configured by the imaging optical system 101, the pupil dividing portion 102, and the image pickup element 103. When an image is taken, the ray from an object space enters the image pickup element 103 via the imaging optical system 101 and the pupil dividing portion 102. The image pickup element 103 is a two-dimensional image pickup element such as a CCD (Charge Coupled Device) or a CMOS (Complementary Metal-Oxide Semiconductor), which includes a plurality of pixels. An energy of the ray that enters the image pickup element 103 via the imaging optical system 101 (a main lens unit) and the pupil dividing portion 102 is converted to an electric signal (an analog signal), and the analog signal is converted to a digital signal by an A/D converter 104. A predetermined processing is performed for this digital signal by an image processing portion 105, and then it is stored in a predetermined format in an image recording medium 110 such as a semiconductor memory. In this case, image pickup condition information of the image pickup apparatus that is obtained from a state detecting portion 108 is also stored at the same time. The image pickup condition information means an object distance, an aperture stop, a focal length of a zoom lens, or the like. The state detecting portion 108 may directly obtain the image pickup condition information from a system controller 111, and with respect to information related to the image pickup optical system, the state detecting portion 108 can also obtain the information from an optical system controller 107.

When the image stored in the image recording medium 110 is displayed on a display portion 106, a reconstruction processing is performed by the image processing portion 105 based on the image pickup condition information. As a result, an image reconstructed so as to be desired point of view, focus position, or a depth of field is displayed on the display portion 106. In order to perform a high speed operation, a desired image setting (the point of view, focusing (the focus position), the depth of field, or the like) may also be previously stored in a storage portion 109 so that a reconstructed image is directly displayed on the display portion 106 without involving the image recording medium 110. Furthermore, the image recorded in the image recording medium 110 may also be the reconstructed image. Thus, the image processing portion 105 reconstructs a first image obtained by the image pickup element 103 using the image pickup condition information for the first image so as to generate a second image.

The user takes an image by controlling the image pickup apparatus using the system controller 111. In the present embodiment, an object which is a reference of focusing before taking an image is referred to as a reference object, and an object on which focusing with high resolution is performed by the user is referred to as a main object. In the image pickup apparatus that obtains the light field, since the focus position can be changed by the refocus after taking the image, the reference object and the main object do not need to coincide with each other.

The optical system controller 107 performs a drive control of the imaging optical system 101. The optical system controller 107 includes a focus adjusting portion 107a that drives a focus unit 101a of the imaging optical system 101 so as to adjust an imaging position of the imaging optical system 101. The focus adjusting portion 107a drives the focus unit 101a of the imaging optical system 101 when the reference object is designated, and thus performs a first focus adjustment so that the imaging position of the imaging optical system 101 with respect to the reference object is adjusted to a predetermined position. In the present embodiment, the focus unit 101a of the imaging optical system 101 is configured by including a single or a plurality of lenses, and it may constitute a whole of the imaging optical system 101.

The focus adjusting portion 107a drives the focus unit 101a, and thus performs a second focus adjustment that moves the imaging position of the imaging optical system 101 by a focus shift amount $\zeta$ that is stored in the storage portion 109. In other words, the focus adjusting portion 107a moves the imaging position of the imaging optical system 101 for the main object so as to improve the resolution of the main object in accordance with a shift amount of pixels combined by the reconstruction. After the second focus adjustment is performed, an image is taken. The focus shift amount is an amount that is determined in accordance with the configuration of the image pickup optical system, and a high-resolution image that is focused on the main object can be obtained by the second focus adjustment. Details of the first focus adjustment and the second focus adjustment will be described below. In the present embodiment, the reference object and the main object coincide with each other.

Series of the controls described above are performed by the system controller 111, and a mechanical drive of the image pickup optical system is performed by the optical system controller 107 based on an instruction of the system controller 111.

Next, referring to FIG. 1, a configuration of the image pickup optical system in the present embodiment will be described. FIG. 1 is a schematic configuration diagram of the image pickup optical system. The image pickup optical system is configured by including an imaging optical system 101, a pupil dividing portion 102 (a lens array 102a), and an image pickup element 103. In the present embodiment, the imaging optical system 101 includes an aperture stop (not shown).

In the present embodiment, the lens array 102a configured by a solid lens is used as the pupil dividing portion 102, but the embodiment is not limited to this and other configurations such as a pinhole array may also be used. In the present embodiment, the lens array 102a is configured by using a plurality of lenses (small lenses), and the small lens is configured by the solid lens. However, the present embodiment is not limited to this, and the lens array 102a may also be configured by using a liquid lens, a liquid crystal lens, a diffractive optical element, or the like. The small lens that constitutes the lens array 102a has surfaces at both sides each having a convex shape. However, the present embodiment is not limited to this, and the small lens may also have the surface at one side having a planar shape and the surface at the other side having a convex shape. However, it is preferred that the surface at the image side of the small lens constituting the lens array 102a has a convex shape. As a result, astigmatism of the lens array 102a is reduced, and an image obtained on the image pickup element 103 is sharpened. Conversely, when the surface at the image side of the small lens does not have a convex shape, the astigmatism is increased and therefore a peripheral region of the image which is formed by each small lens is blurred. When the blurred region of this image is used for the reconstruction processing, there is a case where the image obtained by the reconstruction is not sharply formed. Furthermore, it is preferred that the surface at the object side of the small lens constituting the lens array 102a has a planar shape or a convex shape. As a result, a curvature of the small lens is gentled so as to reduce aberrations, and therefore sharper image can be obtained.

The lens array 102a is disposed at an image side focal point or at an image side relative to the image side focal point of the imaging optical system 101. The lens array 102a is configured so as to have nearly a conjugate relation between the exit pupil of the imaging optical system 101 and the image pickup element 103. The term "nearly a conjugate relation" means a relation that is evaluated as substantially a conjugate relation, as well as an exact conjugate relation. In the present embodiment, a position of the object side principal plane of the lens array 102a is defined as an image side focus plane 202. In addition, a plane conjugate to the image side focus plane 202 via the imaging optical system 101 is a plane on which the focusing is performed in the object space. The plane on which the focusing is performed in the object space is referred to as an object plane 201. The ray from the object plane 201 passes through the imaging optical system 101 and the lens array 102a, and then enters the pixels of the image pickup element 103 different from each other in accordance with a position and an angle of the ray on the object plane 201 so as to obtain the light field. The lens array 102a has a role of preventing the ray passing through the different positions on the object plane 201 from entering the same pixel. As a result, in the image pickup element 103, an image in which pixel groups obtained by taking the same region on the object plane 201 from a plurality of points of view are arrayed is obtained. In the configuration illustrated in FIG. 1, three pixels (nine pixels in a two dimension) take the same position on the object plane 201. Therefore, the image pickup optical system of the present embodiment has a two-dimensional spatial resolution that is deteriorated to $1/3$ ($1/9$ in the two dimension) with respect to an image pickup optical system that obtains only a two-dimensional light intensity distribution. This is qualitatively the same even when the number of pixels that take the same position on the object plane 201 is changed.

Figure 14:
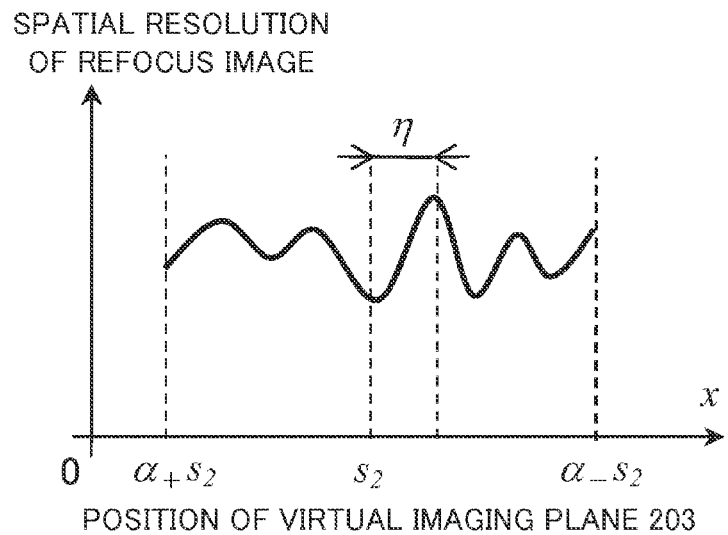
FIG. 14 is a diagram of describing a relation between a position of a virtual imaging plane and a spatial resolution of the refocus image.

The refocus processing in the present embodiment is as described in Embodiment 1 with reference to FIGS. 5A, 5B, and 6. Therefore, descriptions of the refocus processing in the present embodiment is omitted. The state illustrated in FIG. 5A is a state where the refocus image with the highest resolution is obtained since each pixel is shifted by $1/3$ on the virtual imaging plane 203. Referring to FIG. 5A, it is understood that four points indicating the focus positions of the refocus image at which the same effect can be obtained exist in the refocus range. On the contrary, when the pixels for which the parallel translation has been performed are coincident and are overlapped with each other as illustrated in FIG. 5B, the super-resolution from subpixel shift cannot be performed. FIG. 14 is a diagram of schematically illustrating this relation, and a lateral axis indicates the position of the virtual imaging plane 203 and the vertical axis indicates the spatial resolution of the refocus image including the super-resolution from subpixel shift.

Next, the focus adjusting portion 107a in the present embodiment will be described. The focus adjusting portion 107a drives the focus unit 101a of the imaging optical system 101 so as to perform the first focus adjustment and the second focus adjustment. In the first focus adjustment, the imaging position of the imaging optical system 101 for the reference object is adjusted so as to be positioned on the image side focus plane 202. In this adjustment, for example the following method is used. In the configuration of the present embodiment, a plurality of rays that pass through a certain position on the object plane 201 enter the same small lens as illustrated in FIG. 1. Comparing signals of pixel group corresponding to this small lens, it can be determined whether the focusing is performed or not (an in-focus state is obtained or not). When a correlation of the signals of the pixel group by which an image of an edge portion of the reference object is taken is high, the main object exists on the object plane 201, which means that the in-focus state is obtained. On the other hand, when the reference object does not exist on the object plane 201, the correlation of the signals of the pixel group is deteriorated.

Alternatively, the first focus adjustment may be performed based on a contrast of an image. As the image by which the contrast is calculated, an image obtained by extracting only pixels that the ray passing through the same pupil region of the imaging optical system 101 enters may be used, or an image obtained by performing an image processing for the first image obtained by the image pickup element 103 may be used. As one example, an image where the pixel groups corresponding to each small lens are added to be one pixel, or the reconstructed image that is obtained by combining the overlapped pixels as illustrated in FIG. 5B is used. As the image by which the contrast is calculated, a whole of an angle of view obtained by the image pickup element 103 may be used or only an image near the reference object may be used.

As described above, for the image that is focused on the image side focus plane 202 cannot obtain the effect of the super-resolution from subpixel shift as described with reference to FIG. 5B. However, in the present embodiment, the reference object and the main object coincide with each other. Accordingly, in order to obtain a high-resolution object (the main object) designated by the user, i.e. in order to improve the resolution, the imaging position of the imaging optical system 101 may be shifted before taking the image so as to obtain the effect of the super-resolution from subpixel shift. The focus adjustment performed in this time is the second focus adjustment. A shift amount of the focus position at the image side during the second focus adjustment is defined as a focus shift amount. A distance from the image side focus plane 202 to the virtual imaging plane 203 of the imaging optical system 101 corresponding to the main object is denoted by η.

FIG. 14 illustrates one example of the distance η. In the present embodiment, since the reference object and the main object coincide with each other, ζ is equal to η (ζ=η). However, when the reference object and the main object are different from each other, ζ is not equal to η (ζ≠η) except for a case where distances from the image pickup apparatus to both the objects are equal to each other. Referring to FIG. 14, it is understood that the resolution of the reconstructed image is improved when $x=s_2+\zeta=s_2+\eta$ is satisfied, compared to a case where the virtual imaging plane 203 coincides with the image side focus plane 202 ($x=s_2$). Therefore, shifting the imaging position so that the image of the main object is imaged at a position where $x=s_2+\zeta=s_2+\eta$ is satisfied, a high-resolution image that is focused on the main object can be generated. In the present embodiment, the focus shift amount ζ is an amount of improving the spatial resolution in the reconstructed image containing the super-resolution from subpixel shift. Accordingly, the second focus adjustment is different from a conventional focus correction that adjusts a focus position from a paraxial imaging plane so as to improve MTF (Modulation Transfer Function) in its physical meaning.

Figure 15:
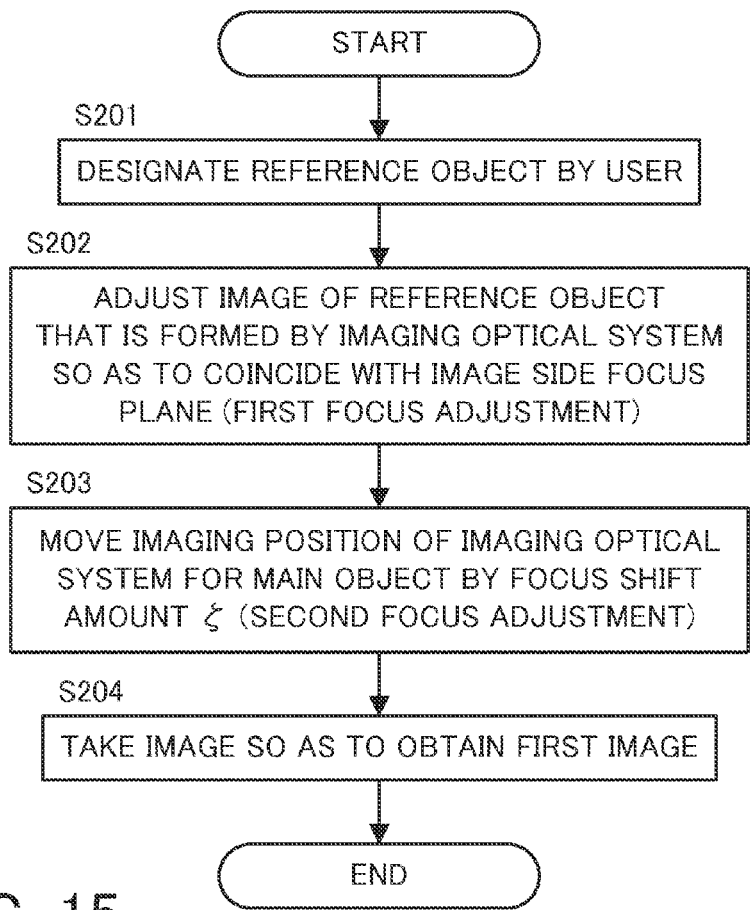
FIG. 15 is a flowchart of illustrating a procedure of taking an image by the image pickup apparatus in Embodiment 4 or 5.

As above, the configuration of the image pickup optical system, the refocus, and the focus adjustment of the present embodiment are described. Next, referring to FIG. 15, a procedure of taking an image using the image pickup apparatus in the present embodiment (a method of controlling the image pickup apparatus) will be described. FIG. 15 is a flowchart of the procedure of taking the image in the present embodiment. Each step of the flowchart of FIG. 15 is performed by the focus adjusting portion 107a or the like based on an instruction of the system controller 111.

First of all, in Step S201, the user designates the reference object on which the focusing is performed. Subsequently, in Step S202, in accordance with the reference object designated in Step S201, the focus adjusting portion 107a performs the first focus adjustment. Specifically, the focus adjusting portion 107a drives the focus unit 101a of the imaging optical system 101 so that the imaging position of the imaging optical system 101 for the reference object coincides with the image side focus plane 202. As a method of determining whether the imaging position coincides with the image side focus plane 202, for example the method described above or the like is used, but the embodiment is not limited to this. In the embodiment, the correction of the focus position may also be performed so that the MTF by the imaging optical system 101 for the image of the reference object is improved on the image side focus plane 202.

Next, in Step S203, the focus adjusting portion 107a performs the second focus adjustment. In other words, the imaging position (the imaging position of the imaging optical system 101) that is determined in Step S202 is shifted by the focus shift amount ζ so as to improve the resolution of the main object in accordance with the shift amount of the pixels combined by the reconstruction. This means that a value that is obtained by dividing the maximum value of the apparent pixel pitch by the pixel pitch comes close to an inverse of the number of the pixels overlapped by the reconstruction, compared to a state before the imaging position is shifted by the focus shift amount ζ. In other words, the focus adjusting portion 107a performs the second focus adjustment so that the value obtained by dividing the maximum value of the apparent pixel pitch formed by the reconstruction by the pixel pitch of the image pickup element 103 comes close to the inverse of the number of the pixels overlapped by the reconstruction.

In order to generate the image focused on the main object by the refocus, the distance η needs to be within the refocus range represented by Expression (2), i.e. within a range of satisfying $-NF\Delta y \le \eta \le NF\Delta y$. Therefore, the focus adjusting portion 107a performs the second focus adjustment so that the distance between the image side focus plane 202 and the virtual imaging plane is adjusted to be not more than $NF\Delta y$.

Referring to FIGS. 5A and 5B, the effect of the super-resolution from subpixel shift is maximized at the four points of $s_2 \pm F\Delta$ and $\alpha_+ s_2 \pm F\Delta$. When a diameter of a permissible circle of confusion is defined as ε, a depth of focus of the imaging optical system 101 is approximately represented by $\pm F\epsilon$. The diameter ε is a value that is determined by a performance required for the image pickup apparatus. For example, ε is determined so that a difference between a spread of a point image within the depth of focus and a spread of a point image at the focus position cannot be sensed by the user. Accordingly, η may be included within the range of $\pm F\epsilon$. In the embodiment, since a relation of $\epsilon \ge \Delta$ is satisfied, $s_2 \pm F\Delta$ that is the focus position at which the maximum effect of the super-resolution from subpixel shift is obtained is definitely included within $s_2 \pm F\epsilon$. When $|\eta|$ exceeds $F\epsilon$, the spread of the point image at the focus position in the refocus image focused on the main object exceeds ε. Therefore, since the focus position of the image is seen to be blurred even when the resolution is improved by the super-resolution from subpixel shift, the sharpness is deteriorated.

It is preferred that η satisfies the following Conditional Expression (8).

$$0.5 < \frac{|\eta|}{F\Delta} < 2.0 \qquad (8)$$

In Conditional Expression (8), $-\sigma_2 \le \eta \le \sigma_2$ is satisfied. Symbol $\sigma_2$ denotes a distance between the image side principal plane of the lens array 102a and the image pickup element 103. Conditional Expression (8) indicates a level of the effect of the super-resolution from subpixel shift. Symbol $\sigma_2/(F\Delta)$ denotes a number of pixels that take an image at the same region of the object plane 201 in the one-dimensional direction, and symbol $|\eta/\sigma_2|$ denotes a ratio of a shift of pixels to be combined. When $|\eta|=F\Delta$ is satisfied, a value of Conditional Expression (8) is equal to 1, which indicates that the effect of the super-resolution from subpixel shift is maximized. The effect of the super-resolution from subpixel shift is weakened as the value of Conditional Expression (8) is distant from 1. A sufficient effect of the super-resolution from subpixel shift cannot be obtained if the value exceeds the upper limit or the lower limit of Conditional Expression (8).

It is more preferred that the following Conditional Expression (8a) is satisfied so as to obtain the image focused on the main object with further higher resolution.

$$0.75 < \frac{|\eta|}{F\Delta} < 1.5 \qquad (8a)$$

Satisfying Conditional Expression (8a), the reconstructed image has high resolution especially when n is small. For example, a case where the F-number of the imaging optical system is 2.800 and the pixel pitch Δ of the image pickup element 103 is 0.006 mm is considered. In this case, the value of Conditional Expression (8) is 1.488 when $\zeta = \eta = 0.025$ (mm) is satisfied, and therefore a high-resolution image that is focused on the main object can be generated. In the present embodiment, the image pickup apparatus may also be configured to perform Steps S202 and S203 at the same time.

Subsequently, in Step S204, the image pickup apparatus takes an image so as to obtain the first image. The first image is stored in the image recording medium 110 after a predetermined image processing is performed by the image processing portion 105. Alternatively, the image processing portion 105 may be configured so as to generate the second image which is focused on the main object from the obtained first image and store the second image in the image recording medium 110. In needed, the image processing portion 105 may also perform the reconstruction processing that changes the point of view or the depth of field along with the refocus processing. In addition, when the reconstruction processing of the image is performed, further higher-resolution is achieved by using an image estimation such as MAP (Maximum a posteriori) as well.

In the configuration described above, according to the present embodiment, an image pickup apparatus and a method of controlling the image pickup apparatus capable of obtaining a main object with high resolution can be provided.

Embodiment 5

Next, Embodiment 5 of the present invention will be described. A basic configuration of an image pickup apparatus in the present embodiment is the same as that of the image pickup apparatus of Embodiment 4 described with reference to FIG. 13, and therefore descriptions thereof will be omitted.

Referring to FIG. 2, a configuration of an image pickup optical system in the present embodiment will be described. FIG. 2 is a schematic configuration diagram of the image pickup optical system. The lens array 102a is disposed at the object side relative to an image side conjugate plane of the imaging optical system 101 with respect to the object plane 201, and the image side conjugate plane and the image pickup element 103 are disposed so as to conjugate to each other via the lens array 102a. In the present embodiment, the image side conjugate plane corresponds to the image side focus plane 202. A ray from the object plane 201 passes through the imaging optical system 101 and the lens array 102a, and then enters pixels of the image pickup element 103 different from each other in accordance with a position and an angle of the ray on the object plane 201 so as to obtain the light field. As a result, the image pickup element 103 obtains an image that is configured by a plurality of arrayed small images which have different shot points of view and shot ranges.

The image pickup optical system illustrated in FIG. 2 has a deteriorated spatial resolution compared to the image pickup optical system which obtains only the two-dimensional light intensity distribution. This is because an image that is formed by the imaging optical system 101 is viewed as an imaginary object by the lens array 102a so that it is reduced to be imaged on the image pickup element 103. The reduction magnification is $\sigma_2/\sigma_1$ times. Symbol $\sigma_1$ denotes a distance between the image side focus plane 202 and the object side principal plane of the lens array 102a, and symbol $\sigma_2$ denotes a distance between the image side principal plane of the lens array 102a and the image pickup element 103. Therefore, the image pickup optical system illustrated in FIG. 2 has two-dimensional spatial resolution improved by $(\sigma_2/\sigma_1)^2$ times with respect to the image pickup optical system which obtains only the two-dimensional light intensity distribution.

A method of generating the refocus image in the present embodiment is as described in Embodiment 2 with reference to FIGS. 8A, 8B, and 9. Therefore, descriptions of the method in the present embodiment are omitted. Also in the present embodiment, the effect of the super-resolution from subpixel shift is changed by the virtual imaging plane 203. Accordingly, as illustrated in FIG. 14, the resolution of the refocus image is changed within a refocus range.

Next, a method of taking an image using the image pickup apparatus of the present embodiment will be described. The method of taking the image in the present embodiment is represented by a flowchart of FIG. 15, and descriptions common to those of Embodiment 4 are omitted.

In Step S201, the user designates the reference object, and subsequently in Step S202, the image of the reference object formed by the imaging optical system 101 is adjusted so as to coincide with the image side focus plane 202 (the first focus adjustment). Then, in Step S203, the second focus adjustment is performed so as to improve the resolution of the reconstructed image that is focused on the main object.

Next, a condition that $\eta$ preferably satisfies will be described. The ratio of the pixel shift in the virtual imaging plane 203 at the time of generating the refocus image is represented by a ratio $\Delta_{LA}\sigma_2/(\Delta\tau)$ that is obtained by dividing $\Delta_{LA}$ by the pitch of the pixels projected on the virtual imaging plane 203. Symbol $\tau$ denotes a distance between the object side principal plane of the imaging optical system 101 and the virtual imaging plane 203. Since the shift of the integral multiple of the pixels is meaningless as illustrated in FIG. 5B, an integer part does not need to be considered. Accordingly, a ratio $\delta$ of the pixel shift is represented as the following Expression (9).

$$\delta = \mathrm{mod}\left(\frac{\Delta_{LA}\sigma_2}{\Delta\tau}, 1\right) \quad (9)$$

In Expression (9), $z=\mathrm{mod}(x,y)$ denotes that z is equal to a remainder obtained by dividing x by y. In the embodiment, the virtual imaging plane 203 that has a great effect of the super-resolution from subpixel shift and that has high resolution is obtained. Therefore, first of all, the number of the overlapped pixels on the virtual imaging plane 203 is estimated. The estimate of the overlapped pixels is as described in Embodiment 2 with reference to FIG. 10. Accordingly, descriptions of the estimate are omitted.

Subsequently, the spatial resolution including the super-resolution from subpixel shift is obtained. As described above, the resolution is the highest when the number of overlapped pixels (the overlap number of the pixels) and the ratio $\delta$ of the pixel shift represented by Expression (9) correspond to each other. For example, when the overlap number of the pixels is 8 and the ratio $\delta$ of the pixel shift is 0.45, the pixel shifts of the eight pixels are 0, 0.45, 0.90, 0.35, 0.80, 0.25, 0.70, and 0.15, respectively. In this case, the maximum value of the apparent pixel pitch that determines the resolution is 0.70−0.45=0.25. Next, a case in which the number of the overlapped pixels is the same and the ratio $\delta$ of the pixel shift is 3/8 will be considered. In this case, the pixel shifts of the eight pixels are 0, 3/8, 6/8, 1/8, 4/8, 7/8, 2/8, and 5/8, respectively. The maximum value of the apparent pixel pitch is 1/8, which is equal to an inverse of the number of the overlapped pixels. Accordingly, the maximum effect of the super-resolution from subpixel shift is obtained. The same is true for any one of cases in which the ratio $\delta$ of the pixel shift is 1/8, 5/8, and 7/8.

However, when the ratio $\delta$ of the pixel shift is any one of 2/8, 4/8, and 6/8, the effect of the super-resolution from subpixel shift is deteriorated. For example, a case in which the ratio $\delta$ of the pixel shift is 2/8 is considered. In this case, the pixel shifts of the eight overlapped pixels are 0, 2/8, 4/8, 6/8, 0, 2/8, 4/8, and 6/8, respectively, and the maximum value of the apparent pixel pitch is 2/8=1/4 since the pixels are overlapped with each other. Accordingly, the effect of the super-resolution from subpixel shift is half of the case in which the ratio $\delta$ of the pixel shift is any one of 1/8, 3/8, 5/8, and 7/8. Thus, when the ratio $\delta$ of the pixel shift is equal to $m_0/M_0$, the maximum effect of the super-resolution from subpixel shift can be obtained. Symbol $M_0$ denotes the number of the overlapped pixels, and symbol $m_0$ denotes an integer that is smaller than $M_0$ and that has the greatest common divisor of 1 for $M_0$. As described above, $M_0$ can be estimated at around $\tau/\sigma_{2r}$ and the effect of the super-resolution from subpixel shift is improved as the ratio $\delta$ of the pixel shift is close to $m_0/M_0$.

As above, it is preferred that the distance $\eta$ is within a range that satisfies the following Conditional Expression (10).

$$0.9 < \frac{M}{m} \text{mod}\left(\frac{\Delta_{LA}\sigma_2}{\Delta|\sigma_1 + \eta|}, 1\right) < 1.1 \quad (10)$$

In the embodiment, symbol M denotes an integer that satisfies the following Conditional Expression (11).

$$0.2 < \frac{M}{|\sigma_1 + \eta|/\sigma_2} < 2.0 \quad (11)$$

Symbol m denotes an integer that is smaller than the integer M and that has the greatest common divisor of 1 for the integer M. Conditional Expressions (10) and (11) represent a level of the effect of the super-resolution from subpixel shift, and a high-resolution refocus image which is focused on a main object can be obtained by satisfying Conditional Expressions (10) and (11). As each of values of Conditional Expressions (10) and (11) is close to 1, the effect of the super-resolution from subpixel shift is improved. On the other hand, the values exceed the upper limits or the lower limits of Conditional Expressions (10) and (11), the effect of sufficient super-resolution from subpixel shift cannot be obtained, and therefore the improvement of the spatial resolution is insufficient.

It is preferred that Conditional Expression (10) is set to a range that satisfies the following Conditional Expression (10a) so as to obtain the reconstructed image that is focused on the main object with higher resolution.

$$0.93 < \frac{M}{m} \text{mod}\left(\frac{\Delta_{LA}\sigma_2}{\Delta|\sigma_1 + \eta|}, 1\right) < 1.07 \quad (10a)$$

It is more preferred that Conditional Expression (10) is set to a range that satisfies the following Conditional Expression (10b) so as to obtain the image with higher resolution.

$$0.95 < \frac{M}{m} \text{mod}\left(\frac{\Delta_{LA}\sigma_2}{\Delta|\sigma_1 + \eta|}, 1\right) < 1.05 \quad (10b)$$

It is preferred that Conditional Expression (11) is set to a range that satisfies the following Conditional Expression (11a) and more preferably Conditional Expression (11b) so as to obtain a further greater effect of the super-resolution from subpixel shift.

$$0.4 < \frac{M}{|\sigma_1 + \eta|/\sigma_2} < 1.6 \quad (11a)$$

$$0.6 < \frac{M}{|\sigma_1 + \eta|/\sigma_2} < 1.4 \quad (11b)$$

For example, a case where the pitch $\Delta_{LA}$ of the lens array 102a is 4.3559 (mm), the pixel pitch $\Delta$ of the image pickup element 103 is 0.0043 (mm), $\sigma_1$ is 37.7657 (mm), and $\sigma_2$ is 5.4325 (mm) is considered. If each of $\zeta$ and $\eta$ is equal to 0.0243 (mm), the value of Conditional Expression (10) is 1.04, and the value of Conditional Expression (11) is 0.7. In the embodiment, M is equal to 5 and m is equal to 3. As a result, an image that is focused on the main object with high resolution can be generated. Since $\zeta$ or $\eta$ depends on the pitch or the arrangement of the lens array 102a, a calibration may be performed at the time of manufacturing the image pickup apparatus so as to previously store $\zeta$ or $\eta$ corrected for each image pickup apparatus in the storage portion 109. This is true for the case of Embodiment 4.

In the configuration described above, according to the present embodiment, an image pickup apparatus and a method of controlling the image pickup apparatus capable of obtaining a main object with high resolution can be provided.

Embodiment 6

Figure 16:
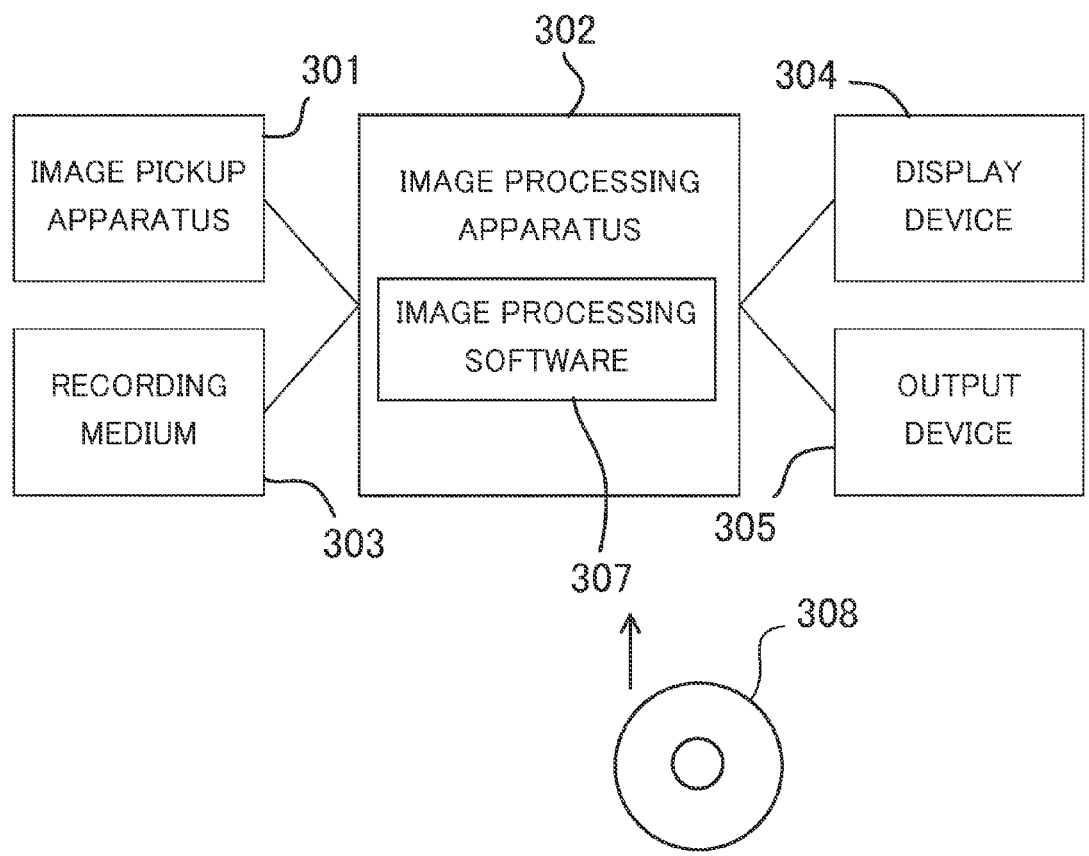
FIG. 16 is a block diagram of an image processing system in Embodiment 6.

Next, Embodiment 6 of the present invention will be described. The present embodiment describes an image processing apparatus (an image processing system) that performs the image processing method described above. FIG. 16 is a block diagram of the image processing system in the present embodiment. In the present embodiment, the reference object and the main object are different from each other.

As illustrated in FIG. 16, the image processing system includes an image pickup apparatus 301. The image pickup apparatus 301 includes for example the image pickup optical system illustrated in FIG. 3. The image pickup apparatus 301 has for example a configuration illustrated in FIG. 17. An image processing apparatus 302 is a computer device (an information processing apparatus) that performs a reconstruction of an image. The image processing apparatus 302 generates a reconstructed image (an output image) from the first image (an input image) obtained by the image pickup apparatus 301. The reconstructed image may be another refocus image or an image where the depth of field or the point of view is adjusted, as well as an image which is focused on the main object. The result is outputted to any one of or a plurality of a storage medium 303, a display device 304, and an output device 305. The storage medium 303 is, for example a semiconductor memory, a hard disk, or a server on a network. The display device 304 is, for example, a liquid crystal display or a projector. The output device 305 is for example a printer. The display device 304 is connected to the image processing apparatus 302, and the reconstructed image is inputted to the display device 304. The user can work while confirming the reconstructed image via the display device 304. Image processing software 307 is installed in the image processing apparatus 302. The image processing software 307 (an image processing program) performs a development processing and other image processings if needed, as well as the reconstruction processing (the image processing method) described above.

The present embodiment can also be achieved by performing the following processing. In other words, it is a processing in which software (a program) that achieves the function described above is provided to the system or the apparatus via a network or a storage medium 308 (a non-transitory computer-readable storage medium) such as a CD-ROM so that a computer (a CPU, an MPU, or the like) of the system or the apparatus can read the program to be executed.

Figure 17:
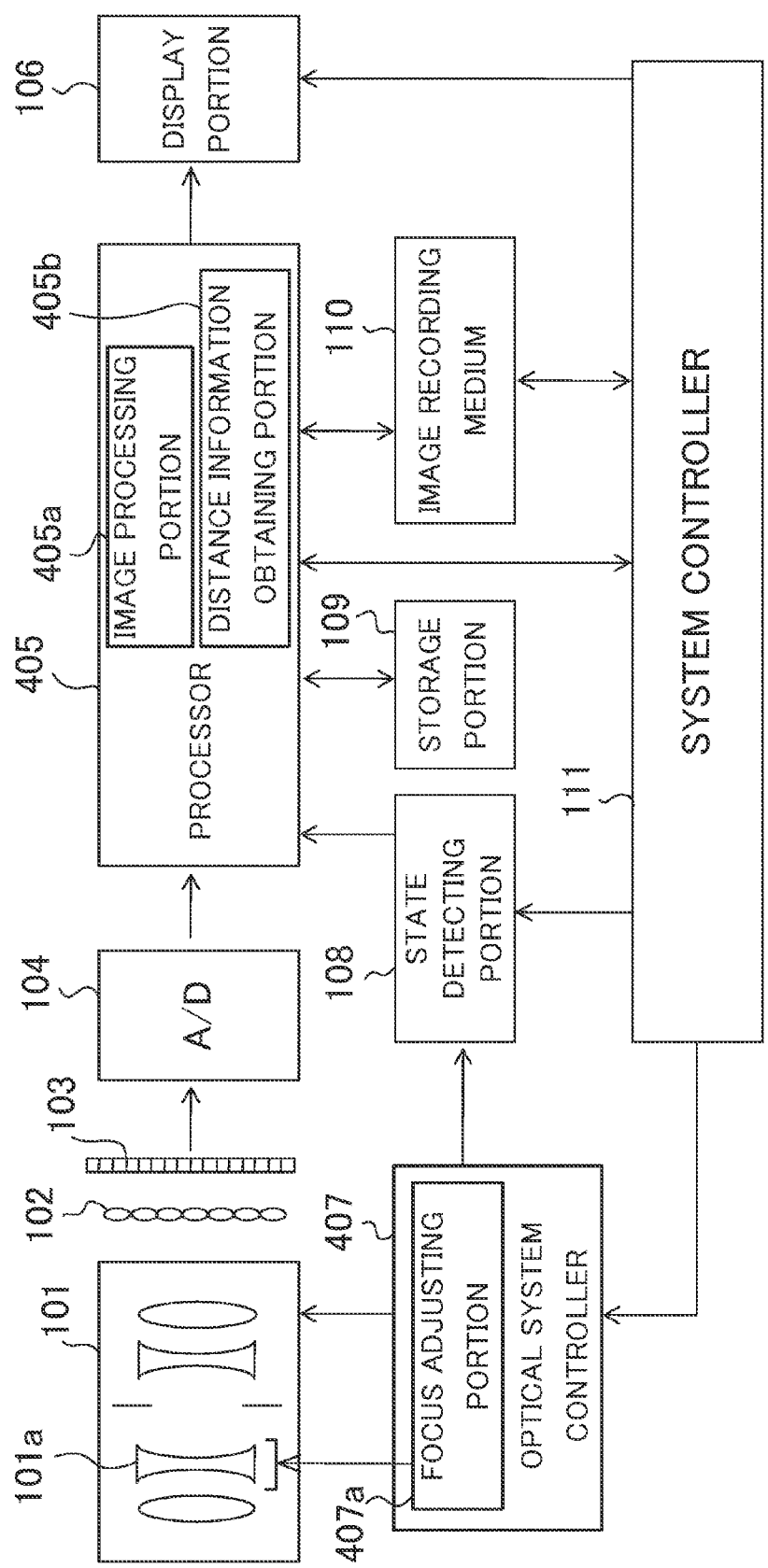
FIG. 17 is a block diagram of an image pickup apparatus in Embodiment 6.

Subsequently, referring to FIG. 17, a configuration of the image pickup apparatus 301 in the present embodiment will be described. FIG. 17 is a block diagram of the image pickup apparatus 301. Since a basic configuration of the image pickup apparatus in the present embodiment is the same as that of the image pickup apparatus of Embodiment 4, only parts that are different from those of Embodiment 4 will be described and other descriptions will be omitted.

A processor 405 is configured by including an image processing portion 405a that performs the reconstruction processing and the like, and a distance information obtaining portion 405b that obtains distance information of the object space. The processor 405 calculates the focus shift amount ζ that is used to perform the second focus adjustment. The focus shift amount ζ calculated by the processor 405 is used by a focus adjusting portion 407a of an optical system controller 407.

The image pickup optical system that constitutes the image pickup apparatus 301 of the present embodiment is arranged as illustrated in FIG. 3. The image pickup optical system of the present embodiment illustrated in FIG. 3 is the same as the configuration of Embodiment 5 illustrated in FIG. 2, except that the lens array 102a is disposed at the image side relative to the image side focus plane 202. A configuration of the present embodiment (FIG. 3) is different from the configuration of Embodiment 5 (FIG. 2) in that the lens array 102a views an image formed by the imaging optical system 101 as a real object so as to reconstruct it on the image pickup element 103. However, the configuration of FIG. 2 and the configuration of FIG. 3 are essentially the same since the lens array 102a views the image that is imaged by the imaging optical system 101 as an object so as to form the image on the image pickup element 103. Accordingly, a method of generating the refocus image of the present embodiment is the same as that of Embodiment 5.

Figure 18:
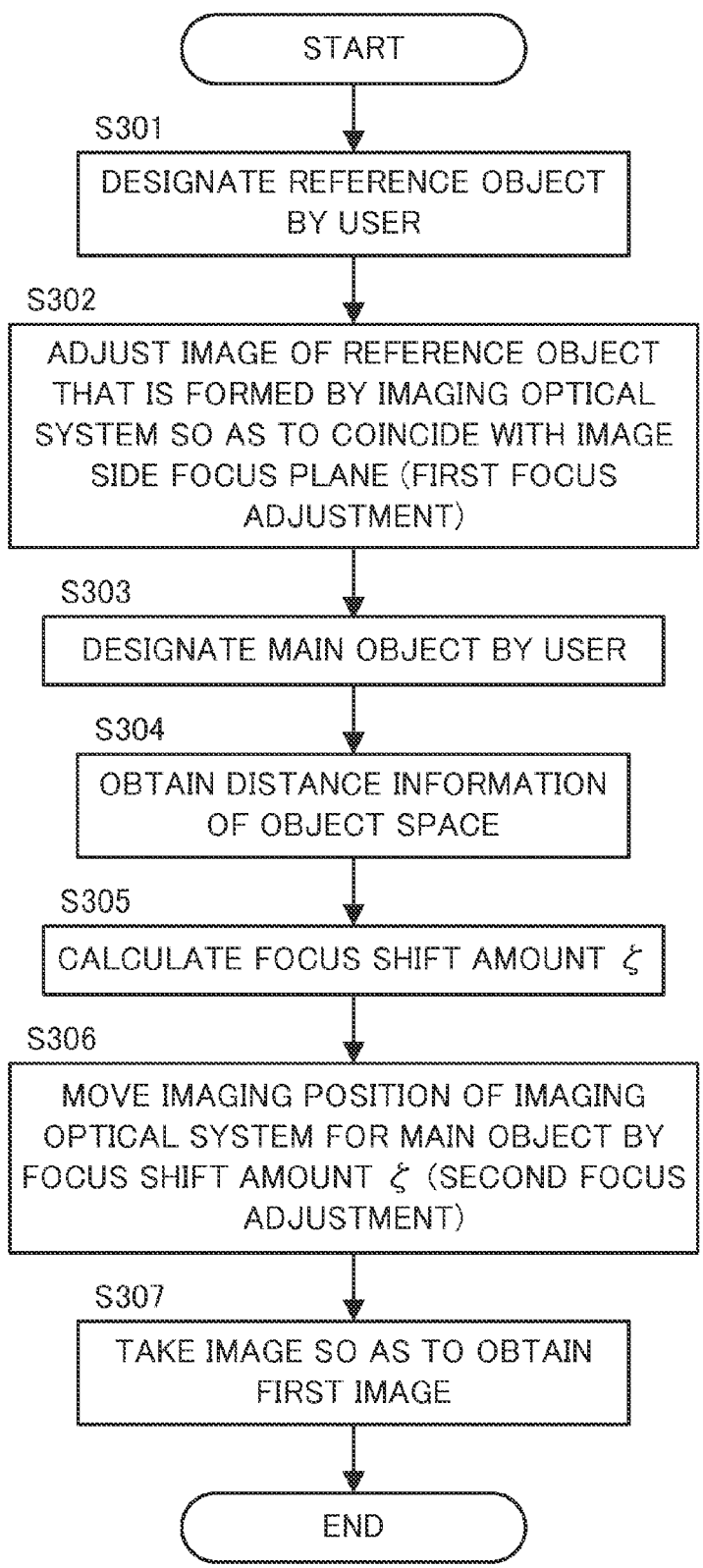
FIG. 18 is a flowchart of illustrating a procedure of taking an image by the image pickup apparatus in Embodiment 6.

Next, referring to FIG. 18, a procedure of taking an image using the image pickup apparatus 301 (a method of controlling the image pickup apparatus) of the present embodiment will be described. FIG. 18 is a flowchart of illustrating the procedure of taking the image in the present embodiment. Each step of FIG. 18 is performed by the focus adjusting portion 407a or the like based on an instruction of the system controller 111.

First of all, in Step S301, the user designates the reference object on which the focusing is to be performed. Subsequently, in Step S302, according to the reference object designated in Step S301, the focus adjusting portion 407a performs the first focus adjustment. In other words, the focus adjusting portion 407a drives the focus unit 101a of the imaging optical system 101 so that the imaging position of the imaging optical system 101 for the reference object coincides with the image side focus plane 202.

Next, in Step S303, the user designates the main object that is an object on which the focusing is to be performed with high resolution. Thus, in the present embodiment, the reference object and the main object are objects different from each other, and the main object is designated after the first focus adjustment for the reference object is performed. However, the present embodiment is not limited to this, and alternatively the designation of the main object (Step S303) may be performed before the reference object is designated (Step S301).

Subsequently, in Step S304, the distance information obtaining portion 405b of the processor 405 obtains the distance information of the object space. For example, the distance information of the object space can be obtained by using the following method. In other words, in the image pickup element 103, parallax information obtained by observing the object space from different points of view can be obtained. Therefore, an image is taken once and then the reconstruction processing is performed, and thus a plurality of parallax images can be obtained. Comparing characteristics of these parallax images, the distance information of the object space can be obtained. Alternatively, a plurality of images may be taken while driving the focus unit 101a of the image pickup optical system so as to obtain the distance information. A unit that obtains the distance information may also be provided separately from the image pickup optical system. When the distances from the image pickup apparatus 301 to the reference object and the main object coincide with each other, the following procedure may also be the same as the procedure after Step S203 of Embodiment 5.

Next, in Step S305, the processor 405 calculates the focus shift amount ζ that is used for the second focus adjustment performed by the focus adjusting portion 407a. In this case, the processor 405 calculates the imaging position of the imaging optical system 101 for the main object based on the distance information obtained by the distance information obtaining portion 405b. The behavior of the ratio δ of the pixel shift for the position of the virtual imaging plane 203 is determined by the configuration of the image pickup optical system as represented by Expression (9). Accordingly, the position of the virtual imaging plane 203 where a high resolution is obtained is previously stored in the storage portion 109, and a difference between the position and the imaging position of the imaging optical system 101 for the main object is obtained to be able to calculate the focus shift amount ζ. There may be one or a plurality of positions of the virtual imaging plane 203 where the high resolution is obtained that are previously stored in the storage portion 109, or a value corrected by performing a calibration at the time of manufacturing the image pickup apparatus 301 may also be used.

Subsequently, in Step S306, the focus adjusting portion 407a performs the second focus adjustment so as to change the imaging position by the focus shift amount calculated by the processor 405. The refocus range is limited as represented by Expression (4). Therefore, it is necessary that the distance η from the image side focus plane 202 to the virtual imaging plane 203 corresponding to the main object after the second focus adjustment is within NFΔy. In addition, similarly to Embodiment 4, it is preferred that the spread of the point image in the refocus image that is focused on the main object is within ε. Therefore, it is preferred that η is within the depth of focus of the imaging optical system 101. In this case, the focus adjusting portion 407a performs the second focus adjustment so that the distance between the image side focus plane 202 and the virtual imaging plane is within the depth of focus of the imaging optical system 101. Similarly to Embodiment 5, it is preferred that at least one of Conditional Expressions (10), (10a), (10b), (11), (11a), and (11b) is satisfied.

For example, a case where the pitch $\Delta_{LA}$ of the lens array 102a is 4.3559 (mm), the pixel pitch Δ of the image pickup element 103 is 0.0043 (mm), $\sigma_1$ is 37.7657 (mm), and $\sigma_2$ is 5.4325 (mm) is considered. Since the reference object and the main object do not coincide with each other, a position of the imaging plane corresponding to the main object is commonly different from $\sigma_1$. In the embodiment, the position τ of the imaging plane is 37.7100 (mm). In this case, when ζ is 0.0100 (mm), η is −0.0457 (mm), and the value of Conditional Expression (10) is 1.01, and the value of Conditional Expression (11) is 1.3. In the embodiment, M is equal to 9 and m is equal to 8. As a result, an image that is focused on the main object with high resolution can be generated.

Finally, in Step S307, the image pickup apparatus 301 takes an image so as to obtain the first image.

In the configuration described above, according to Embodiments 4 to 6, an image pickup apparatus and a method of controlling the image pickup apparatus capable of obtaining a main object with high resolution can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-131641 and 2012-131598, filed on Jun. 11, 2012, which are hereby incorporated by reference herein in their entireties.

What is claimed is:

1. An image processing method for performing a reconstruction for an input image so as to generate a plurality of output images having a plurality of focus positions different from each other, the image processing method comprising the steps of:
obtaining the input image, the input image including information of a light field taken by an image pickup apparatus having an imaging optical system and an image pickup element including a plurality of pixels; and
calculating a pixel shift amount of pixels that are to be combined by the reconstruction for a plurality of virtual imaging planes corresponding to the plurality of focus positions,
wherein the pixel shift amount is a shift amount of overlap pixels which are projected on the plurality of virtual imaging planes.

2. The image processing method according to claim 1, further comprising the step of performing an output based at least on the pixel shift amount.

3. The image processing method according to claim 1, further comprising the step of generating the output image at a focus position based at least on the pixel shift amount.

4. The image processing method according to claim 1, wherein a resolution of the output image is determined based at least on the pixel shift amount.

5. The image processing method according to claim 1, wherein the pixel shift amount is smaller than a size of each of the pixels of the image pickup element.

6. The image processing method according to claim 1, wherein the pixel shift amount is not an integral multiple of a size of each of the pixels of the image pickup element.

7. The image processing method according to claim 1, wherein the reconstruction is performed by combining the overlapped pixels to reduce an apparent pixel size.

8. The image processing method according to claim 1, wherein the reconstruction is performed by combining the overlapped pixels to achieve super-resolution using a sub-pixel shift.

9. The image processing method according to claim 1, wherein the input image includes information of an object space obtained from a plurality of points of view using the image pickup apparatus.

10. The image processing method according to claim 1, wherein the pixel shift amount is calculated based on information relating to a configuration of the image pickup apparatus.

11. An image pickup apparatus configured to perform a reconstruction for an input image so as to generate a plurality of output images having a plurality of focus positions different from each other, the image pickup apparatus comprising:
an imaging optical system;
an image pickup element including a plurality of pixels;
a pupil divider configured so that a ray from the same position of an object plane enters a plurality of pixels of the image pickup element, each pixel of the plurality of pixels different from each other, in accordance with a pupil region of the imaging optical system through which the ray passes; and
an image processor configured to perform the reconstruction for the input image using image pickup condition information of the input image so as to generate the output image,
wherein the image processor is configured to calculate a pixel shift amount of the plurality of pixels that are to be combined by the reconstruction for a plurality of virtual imaging planes corresponding to the plurality of focus positions, and
wherein the pixel shift amount is a shift amount of overlapped pixels which are projected on the plurality of virtual imaging planes.

12. The image pickup apparatus according to claim 11, wherein the image processor is configured to perform an output based on the pixel shift amount.

13. The image pickup apparatus according to claim 11, wherein the image processor is configured to generate the output image at a focus position determined based on the pixel shift amount.

14. The image pickup apparatus according to claim 11, wherein a resolution of the output image is determined based at least on the pixel shift amount.

15. The image pickup apparatus according to claim 11, wherein the pixel shift amount is smaller than a size of each of the pixels of the image pickup element.

16. The image pickup apparatus according to claim 11, wherein the pixel shift amount is not an integral multiple of a size of each of the pixels of the image pickup element.

17. The image pickup apparatus according to claim 11, wherein the reconstruction is performed by combining the overlapped pixels to reduce an apparent pixel size.

18. The image pickup apparatus according to claim 11, wherein the reconstruction is performed by combining the overlapped pixels to achieve super-resolution using a sub-pixel shift.

19. The image pickup apparatus according to claim 11, wherein the pixel shift amount is calculated based on information relating to a configuration of the image pickup apparatus.

20. An image processing apparatus configured to perform a reconstruction for an input image so as to generate a plurality of output images having a plurality of focus positions different from each other, the image processing apparatus comprising:
a non-transitory computer-readable storage medium configured to store image pickup condition information of the input image; and
an image processor configured to perform the reconstruction for the input image using the image pickup condition information of the input image so as to generate the output image,
wherein the image processor is configured to calculate a pixel shift amount of pixels that are to be combined by the reconstruction for a plurality of virtual imaging planes corresponding to a plurality of focus positions, and
wherein the pixel shift amount is a shift amount of overlapped pixels which are projected on the plurality of virtual imaging planes.

21. A non-transitory computer-readable storage medium that stores a program configured to perform a reconstruction for an input image so as to generate a plurality output images having a plurality of focus positions different from each other, the program executable by an information processing apparatus to execute a method comprising the steps of:
   obtaining the input image, the input image including information of a light field taken by an image pickup apparatus having an imaging optical system and an image pickup element including a plurality of pixels; and
   calculating a pixel shift amount of pixels that are to be combined by the reconstruction for a plurality of virtual imaging planes corresponding to the plurality of focus positions,
   wherein the pixel shift amount is a shift amount of overlapped pixels which are projected on the plurality of virtual imaging planes.

\* \* \* \* \*